(12) United States Patent  
Katz et al.

(10) Patent No.: US 9,628,843 B2  
(45) Date of Patent: Apr. 18, 2017

(54) METHODS FOR CONTROLLING ELECTRONIC DEVICES USING GESTURES

(75) Inventors: Sagi Katz, Yokneam Ilit (IL); Avishai Adler, Kiryat Haim (IL); Giora Yahav, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 449 days.

(21) Appl. No.: 13/301,425

(22) Filed: Nov. 21, 2011

(65) Prior Publication Data

US 2013/0131836 A1 May 23, 2013

(51) Int. Cl.
*H04N 21/422* (2011.01)
*G06F 3/01* (2006.01)
(Continued)

(52) U.S. Cl.
CPC .......... *H04N 21/422* (2013.01); *G06F 3/017* (2013.01); *G06K 9/00201* (2013.01); *G06K 9/00335* (2013.01); *G06K 9/209* (2013.01); *H04N 21/42221* (2013.01); *H04N 21/44218* (2013.01); *A63F 2300/1093* (2013.01)

(58) Field of Classification Search
CPC .......... H04N 21/422; H04N 21/42221; H04N 21/44218; G06K 9/00335; G06K 9/209; G06K 9/00201; G06F 3/017; A63F 2300/1093
See application file for complete search history.

(56) References Cited

U.S. PATENT DOCUMENTS 5,227,898 A * 7/1993 Iavecchia et al. ............... 359/9
5,774,357 A 6/1998 Hoffberg
(Continued)

FOREIGN PATENT DOCUMENTS

CN 102238350 A * 11/2011
GB 2265484 A * 9/1993

OTHER PUBLICATIONS

Bergh, M.V. and Gool, L.V., "Combining RGB and ToF Cameras for Real-Time 3D Hand Gesture Interaction", Jan. 2011, 2011 IEEE Workshop on Applications of Computer Vision (WACV), pp. 66-72.*

(Continued)

*Primary Examiner* — Kelvin Booker
(74) *Attorney, Agent, or Firm* — Vierra Magen Marcus LLP

(57) ABSTRACT

A system for controlling infrared (IR) enabled devices by projecting coded IR pulses from an active illumination depth camera is described. In some embodiments, a gesture recognition system includes an active illumination depth camera such as a depth camera that utilizes time-of-flight (TOF) or structured light techniques for obtaining depth information. The gesture recognition system may detect the performance of a particular gesture associated with a particular electronic device, determine a set of device instructions in response to detecting the particular gesture, and transmit the set of device instructions to the particular electronic device utilizing coded IR pulses. The coded IR pulses may imitate the IR pulses associated with a remote control protocol. In some cases, the coded IR pulses transmitted may also be used by the active illumination depth camera for determining depth information.

16 Claims, 15 Drawing Sheets

(51) Int. Cl.
*G06K 9/00* (2006.01)
*H04N 21/442* (2011.01)
*G06K 9/20* (2006.01)

(56) References Cited

U.S. PATENT DOCUMENTS

| | | | |
|---|---|---|---|
| 6,957,775 B2* | 10/2005 | Tsikos | G06K 7/10722 235/462.01 |
| 6,971,578 B2* | 12/2005 | Tsikos | G06K 7/10574 235/454 |
| 7,586,398 B2 | 9/2009 | Huang | |
| 7,831,358 B2* | 11/2010 | Breed et al. | 701/45 |
| 7,961,910 B2* | 6/2011 | Lee et al. | 382/103 |
| 7,971,157 B2* | 6/2011 | Markovic et al. | 715/863 |
| 7,996,793 B2* | 8/2011 | Latta et al. | 715/864 |
| 8,009,867 B2* | 8/2011 | Mathe et al. | 382/103 |
| 8,145,594 B2* | 3/2012 | Geisner et al. | 707/607 |
| 8,166,421 B2* | 4/2012 | Magal et al. | 715/863 |
| 8,213,680 B2* | 7/2012 | Fitzgibbon et al. | 382/103 |
| 8,253,746 B2* | 8/2012 | Geisner et al. | 345/474 |
| 8,259,163 B2 | 9/2012 | Bell | |
| 8,264,536 B2* | 9/2012 | McEldowney | 348/135 |
| 8,267,781 B2* | 9/2012 | Geiss | 463/32 |
| 8,279,418 B2* | 10/2012 | Yee et al. | 356/5.01 |
| 8,284,847 B2* | 10/2012 | Adermann | 375/240.29 |
| 8,290,249 B2* | 10/2012 | Mathe et al. | 382/154 |
| 8,294,767 B2* | 10/2012 | Mathe et al. | 348/154 |
| 8,295,546 B2* | 10/2012 | Craig et al. | 382/103 |
| 8,296,151 B2* | 10/2012 | Klein et al. | 704/275 |
| 8,320,619 B2* | 11/2012 | Mathe | 382/103 |
| 8,320,621 B2* | 11/2012 | McEldowney | 382/103 |
| 8,325,984 B2* | 12/2012 | Lee et al. | 382/103 |
| 8,330,822 B2* | 12/2012 | McEldowney et al. | 348/207.99 |
| 8,334,842 B2* | 12/2012 | Markovic et al. | 345/158 |
| 8,340,432 B2* | 12/2012 | Mathe et al. | 382/190 |
| 8,351,651 B2* | 1/2013 | Lee | 382/103 |
| 8,351,652 B2* | 1/2013 | Mathe | 382/103 |
| 8,374,423 B2* | 2/2013 | Lee et al. | 382/154 |
| 8,379,101 B2* | 2/2013 | Mathe et al. | 348/222.1 |
| 8,385,596 B2* | 2/2013 | Latta et al. | 382/103 |
| 8,390,680 B2* | 3/2013 | Perez et al. | 348/77 |
| 8,418,085 B2* | 4/2013 | Snook et al. | 715/863 |
| 8,432,391 B2* | 4/2013 | Ishibashi | 345/419 |
| 8,451,278 B2* | 5/2013 | Geisner et al. | 345/474 |
| 8,452,051 B1* | 5/2013 | Lee | 382/103 |
| 8,456,534 B2* | 6/2013 | Henty | 348/207.99 |
| 8,457,353 B2* | 6/2013 | Reville et al. | 382/103 |
| 8,467,574 B2* | 6/2013 | Mathe et al. | 382/103 |
| 8,472,665 B2* | 6/2013 | Hildreth | 382/103 |
| 8,483,436 B2* | 7/2013 | Lee et al. | 382/103 |
| 8,487,871 B2* | 7/2013 | Langridge et al. | 345/157 |
| 8,487,938 B2* | 7/2013 | Latta et al. | 345/473 |
| 8,488,888 B2* | 7/2013 | Balan et al. | 382/224 |
| 8,497,838 B2* | 7/2013 | Langridge | 345/157 |
| 8,503,766 B2* | 8/2013 | Mathe et al. | 382/154 |
| 8,509,479 B2* | 8/2013 | Margolis | 382/103 |
| 8,514,269 B2* | 8/2013 | Adler et al. | 348/46 |
| 8,523,667 B2* | 9/2013 | Clavin et al. | 463/29 |
| 8,542,252 B2* | 9/2013 | Perez et al. | 345/649 |
| 8,542,910 B2* | 9/2013 | Leyvand et al. | 382/154 |
| 8,548,270 B2* | 10/2013 | Katz et al. | 382/286 |
| 8,564,534 B2* | 10/2013 | Leyvand et al. | 345/156 |
| 8,565,476 B2* | 10/2013 | Geiss | 382/103 |
| 8,565,477 B2* | 10/2013 | Geiss | 382/103 |
| 8,565,485 B2* | 10/2013 | Craig et al. | 382/103 |
| 8,571,263 B2* | 10/2013 | Shotton et al. | 382/103 |
| 8,577,084 B2* | 11/2013 | Geiss | 382/103 |
| 8,577,085 B2* | 11/2013 | Geiss | 382/103 |
| 8,577,092 B2* | 11/2013 | Kim et al. | 382/115 |
| 8,578,302 B2* | 11/2013 | Markovic et al. | 715/863 |
| 8,587,583 B2* | 11/2013 | Newcombe et al. | 345/420 |
| 8,588,465 B2* | 11/2013 | Geiss | 382/103 |
| 8,588,517 B2* | 11/2013 | Lee et al. | 382/154 |
| 8,610,723 B2* | 12/2013 | Lee et al. | 345/473 |
| 8,613,666 B2* | 12/2013 | Esaki et al. | 463/39 |
| 8,625,897 B2* | 1/2014 | Criminisi et al. | 382/173 |
| 8,631,355 B2* | 1/2014 | Murillo et al. | 715/863 |
| 8,638,985 B2* | 1/2014 | Shotton et al. | 382/103 |
| 8,639,020 B1* | 1/2014 | Kutliroff | G06T 7/0071 345/420 |
| 8,681,255 B2* | 3/2014 | Katz et al. | 348/333.01 |
| 9,285,477 B1* | 3/2016 | Smith | G01S 17/89 |
| 2002/0139853 A1* | 10/2002 | Tsikos | B82Y 15/00 235/462.01 |
| 2002/0145042 A1* | 10/2002 | Knowles | B82Y 15/00 235/462.01 |
| 2002/0153422 A1* | 10/2002 | Tsikos | G06K 7/10742 235/454 |
| 2003/0042303 A1* | 3/2003 | Tsikos | G06K 7/10594 235/384 |
| 2003/0052169 A1* | 3/2003 | Tsikos | G06K 9/26 235/454 |
| 2003/0222843 A1* | 12/2003 | Birmingham | 345/156 |
| 2004/0048666 A1* | 3/2004 | Bagley | A63F 13/06 463/39 |
| 2004/0135819 A1* | 7/2004 | Maa | 345/840 |
| 2004/0141321 A1* | 7/2004 | Dowling | A63H 33/22 362/276 |
| 2005/0131607 A1* | 6/2005 | Breed | 701/45 |
| 2005/0271279 A1* | 12/2005 | Fujimura et al. | 382/203 |
| 2005/0276441 A1* | 12/2005 | Debevec | H04N 5/222 382/100 |
| 2006/0001543 A1* | 1/2006 | Raskar | G01S 5/16 340/572.1 |
| 2006/0110008 A1* | 5/2006 | Vertegaal | G06K 9/00604 382/103 |
| 2006/0233389 A1* | 10/2006 | Mao | H04R 1/406 381/92 |
| 2006/0239471 A1* | 10/2006 | Mao | H04R 1/406 381/92 |
| 2006/0252474 A1* | 11/2006 | Zalewski | A63F 13/10 463/1 |
| 2006/0252475 A1* | 11/2006 | Zalewski | A63F 13/02 463/1 |
| 2006/0252477 A1* | 11/2006 | Zalewski | A63F 13/00 463/7 |
| 2006/0252541 A1* | 11/2006 | Zalewski | A63F 13/02 463/36 |
| 2006/0256081 A1* | 11/2006 | Zalewski | A63F 13/06 345/156 |
| 2006/0256224 A1* | 11/2006 | Kitaura | H04N 5/4403 348/333.01 |
| 2006/0264258 A1* | 11/2006 | Zalewski | A63F 13/00 463/36 |
| 2006/0264259 A1* | 11/2006 | Zalewski | A63F 13/00 463/36 |
| 2006/0264260 A1* | 11/2006 | Zalewski | A63F 13/06 463/36 |
| 2006/0274032 A1* | 12/2006 | Mao | A63F 13/06 345/156 |
| 2006/0274911 A1* | 12/2006 | Mao | A63F 13/06 381/334 |
| 2006/0282873 A1* | 12/2006 | Zalewski | A63F 13/06 725/133 |
| 2006/0287084 A1* | 12/2006 | Mao | A63F 13/06 463/37 |
| 2006/0287085 A1* | 12/2006 | Mao | A63F 13/06 463/37 |
| 2006/0287086 A1* | 12/2006 | Zalewski | A63F 13/213 463/37 |
| 2006/0287087 A1* | 12/2006 | Zalewski | A63F 13/211 463/37 |
| 2007/0015558 A1* | 1/2007 | Zalewski | A63F 13/10 463/1 |
| 2007/0015559 A1* | 1/2007 | Zalewski | A63F 13/10 463/1 |
| 2007/0021208 A1* | 1/2007 | Mao | G06F 3/017 463/36 |
| 2007/0058047 A1* | 3/2007 | Henty | 348/211.99 |
| 2007/0086624 A1* | 4/2007 | Breed et al. | 382/104 |
| 2007/0135984 A1* | 6/2007 | Breed et al. | 701/45 |

(56) References Cited

U.S. PATENT DOCUMENTS

| | | |
|---|---|---|
| 2007/0156317 A1* | 7/2007 | Breed .................... 701/45 |
| 2007/0265075 A1* | 11/2007 | Zalewski ............ A63F 13/06 463/36 |
| 2007/0282506 A1* | 12/2007 | Breed et al. ................ 701/45 |
| 2008/0009348 A1* | 1/2008 | Zalewski ............ A63F 13/10 463/40 |
| 2008/0065291 A1* | 3/2008 | Breed ....................... 701/36 |
| 2008/0080789 A1* | 4/2008 | Marks ................. A63F 13/06 382/296 |
| 2008/0096654 A1* | 4/2008 | Mondesir ............ A63F 13/06 463/31 |
| 2008/0096657 A1* | 4/2008 | Benoist .............. A63F 13/06 463/36 |
| 2008/0098448 A1* | 4/2008 | Mondesir ......... H04N 21/42201 725/126 |
| 2008/0100825 A1* | 5/2008 | Zalewski ............ A63F 13/06 356/29 |
| 2008/0195261 A1* | 8/2008 | Breed .......................... 701/2 |
| 2008/0214253 A1* | 9/2008 | Gillo .................. A63F 13/31 463/1 |
| 2008/0215974 A1* | 9/2008 | Harrison et al. ............ 715/706 |
| 2008/0273755 A1* | 11/2008 | Hildreth .................... 382/103 |
| 2009/0033623 A1* | 2/2009 | Lin ..................... G06F 3/014 345/158 |
| 2009/0115723 A1* | 5/2009 | Henty ...................... 345/158 |
| 2009/0122146 A1* | 5/2009 | Zalewski ............ A63F 13/06 348/169 |
| 2009/0153288 A1 | 6/2009 | Hope |
| 2009/0183193 A1* | 7/2009 | Miller, IV ............ G06F 3/017 725/10 |
| 2010/0007582 A1 | 1/2010 | Zalewski |
| 2010/0060722 A1* | 3/2010 | Bell ..................... G06F 3/017 348/51 |
| 2010/0194762 A1* | 8/2010 | Latta et al. ................ 345/473 |
| 2010/0194872 A1* | 8/2010 | Mathe et al. ................ 348/77 |
| 2010/0199228 A1* | 8/2010 | Latta et al. ................ 715/863 |
| 2010/0199230 A1* | 8/2010 | Latta et al. ................ 715/863 |
| 2010/0199231 A1* | 8/2010 | Markovic et al. ........... 715/863 |
| 2010/0214214 A1* | 8/2010 | Corson ............... G06F 3/0346 345/158 |
| 2010/0238182 A1* | 9/2010 | Geisner et al. ............ 345/474 |
| 2010/0241998 A1* | 9/2010 | Latta et al. ................ 715/862 |
| 2010/0266210 A1* | 10/2010 | Markovic et al. ........... 382/195 |
| 2010/0277411 A1* | 11/2010 | Yee .................... G06F 3/017 345/156 |
| 2010/0277470 A1* | 11/2010 | Margolis ............ G06K 9/00342 345/419 |
| 2010/0277489 A1* | 11/2010 | Geisner et al. ............ 345/581 |
| 2010/0278384 A1* | 11/2010 | Shotton ............ G06K 9/00369 382/103 |
| 2010/0278393 A1* | 11/2010 | Snook et al. ............... 345/156 |
| 2010/0278431 A1* | 11/2010 | Mathe et al. .............. 382/190 |
| 2010/0281432 A1* | 11/2010 | Geisner et al. ............ 715/849 |
| 2010/0281436 A1* | 11/2010 | Kipman ............... G06F 3/011 715/863 |
| 2010/0281437 A1* | 11/2010 | Stone-Perez ........ G06F 3/011 715/863 |
| 2010/0281439 A1* | 11/2010 | Markovic et al. ........... 715/863 |
| 2010/0302015 A1* | 12/2010 | Kipman ............... G06F 3/011 340/407.1 |
| 2010/0302138 A1* | 12/2010 | Poot et al. ................. 345/156 |
| 2010/0302247 A1* | 12/2010 | Perez ................. G06K 9/00201 345/440 |
| 2010/0302253 A1* | 12/2010 | Kipman ............... G06T 13/40 345/473 |
| 2010/0302257 A1* | 12/2010 | Perez .................... A63F 13/57 345/474 |
| 2010/0302357 A1 | 12/2010 | Hsu |
| 2010/0302365 A1* | 12/2010 | Finocchio et al. ........... 348/142 |
| 2010/0302395 A1* | 12/2010 | Mathe et al. ............. 348/222.1 |
| 2010/0303289 A1* | 12/2010 | Polzin et al. ............... 382/103 |
| 2010/0303290 A1* | 12/2010 | Mathe ......................... 382/103 |
| 2010/0303291 A1* | 12/2010 | Margolis .................... 382/103 |
| 2010/0303302 A1* | 12/2010 | Kipman et al. .............. 382/107 |
| 2010/0304813 A1* | 12/2010 | Finocchio ............ G06F 3/011 463/8 |
| 2010/0306261 A1* | 12/2010 | Geisner et al. ............ 707/776 |
| 2010/0306685 A1* | 12/2010 | Giaimo et al. ............. 715/765 |
| 2010/0306712 A1* | 12/2010 | Snook et al. ............... 715/863 |
| 2010/0306713 A1* | 12/2010 | Geisner et al. ............ 715/863 |
| 2010/0306714 A1* | 12/2010 | Latta et al. ................ 715/863 |
| 2010/0306715 A1* | 12/2010 | Geisner et al. ............ 715/863 |
| 2010/0306716 A1* | 12/2010 | Perez ........................ 715/863 |
| 2010/0315336 A1* | 12/2010 | Butler .................. G06F 3/017 345/158 |
| 2011/0007079 A1* | 1/2011 | Perez et al. ................ 345/473 |
| 2011/0007142 A1* | 1/2011 | Perez et al. ................. 348/77 |
| 2011/0014981 A1* | 1/2011 | Mao ..................... H04R 3/005 463/36 |
| 2011/0018864 A1* | 1/2011 | Ishibashi .................... 345/419 |
| 2011/0025689 A1* | 2/2011 | Perez et al. ................ 345/420 |
| 2011/0032336 A1* | 2/2011 | Mathe et al. ................ 348/46 |
| 2011/0035666 A1* | 2/2011 | Geisner et al. ............ 715/709 |
| 2011/0055846 A1* | 3/2011 | Perez ..................... G06F 3/017 719/313 |
| 2011/0058107 A1 | 3/2011 | Sun |
| 2011/0065496 A1* | 3/2011 | Gagner ............ G07F 17/3209 463/25 |
| 2011/0080336 A1* | 4/2011 | Leyvand et al. ............ 345/156 |
| 2011/0080475 A1* | 4/2011 | Lee et al. ..................... 348/77 |
| 2011/0081044 A1* | 4/2011 | Peeper et al. .............. 382/103 |
| 2011/0081045 A1* | 4/2011 | Lee et al. .................... 382/103 |
| 2011/0085705 A1* | 4/2011 | Izadi et al. ................. 382/103 |
| 2011/0093820 A1* | 4/2011 | Zhang et al. ............... 715/863 |
| 2011/0095873 A1 | 4/2011 | Pratt |
| 2011/0102321 A1* | 5/2011 | Son ............................ 345/158 |
| 2011/0102438 A1* | 5/2011 | Mathe et al. ............... 345/426 |
| 2011/0109617 A1* | 5/2011 | Snook et al. ............... 345/419 |
| 2011/0109724 A1* | 5/2011 | Mathe et al. ................ 348/46 |
| 2011/0115880 A1* | 5/2011 | Yoo et al. ..................... 348/42 |
| 2011/0119216 A1* | 5/2011 | Wigdor ............... G06F 3/017 706/46 |
| 2011/0119640 A1* | 5/2011 | Berkes et al. ............. 715/863 |
| 2011/0150271 A1* | 6/2011 | Lee et al. .................... 382/103 |
| 2011/0154266 A1* | 6/2011 | Friend ................. A63F 13/06 715/863 |
| 2011/0169726 A1* | 7/2011 | Holmdahl et al. ........... 345/156 |
| 2011/0173204 A1* | 7/2011 | Murillo et al. ............. 707/741 |
| 2011/0173574 A1* | 7/2011 | Clavin ................. G06F 3/017 715/863 |
| 2011/0175801 A1* | 7/2011 | Markovic ............. G06F 3/017 345/156 |
| 2011/0175810 A1* | 7/2011 | Markovic ............. G06F 3/017 345/158 |
| 2011/0190055 A1* | 8/2011 | Leyvand et al. ............ 463/36 |
| 2011/0197167 A1* | 8/2011 | Kwon et al. ............... 715/848 |
| 2011/0205341 A1* | 8/2011 | Wilson et al. ................ 348/51 |
| 2011/0210915 A1* | 9/2011 | Shotton ............ G06K 9/00369 345/157 |
| 2011/0221755 A1* | 9/2011 | Geisner et al. ............ 345/474 |
| 2011/0223995 A1* | 9/2011 | Geisner et al. ............. 463/36 |
| 2011/0231802 A1* | 9/2011 | Lee et al. ................... 715/848 |
| 2011/0234481 A1* | 9/2011 | Katz ...................... H04N 9/31 345/156 |
| 2011/0234490 A1* | 9/2011 | Markovic et al. ........... 345/156 |
| 2011/0234492 A1* | 9/2011 | Ajmera ................ G06F 3/017 345/158 |
| 2011/0234589 A1* | 9/2011 | Lee et al. ................... 345/424 |
| 2011/0237324 A1* | 9/2011 | Clavin et al. ................ 463/29 |
| 2011/0246329 A1* | 10/2011 | Geisner ................ G06F 3/017 705/27.1 |
| 2011/0267269 A1* | 11/2011 | Tardif .................. G06F 3/011 345/158 |
| 2011/0271235 A1* | 11/2011 | Doyen et al. .............. 715/863 |
| 2011/0279368 A1* | 11/2011 | Klein ................... G06F 3/011 345/158 |
| 2011/0285620 A1* | 11/2011 | Latta et al. ................ 345/156 |
| 2011/0285626 A1* | 11/2011 | Latta et al. ................ 345/158 |
| 2011/0288684 A1* | 11/2011 | Farlow et al. ............. 700/264 |
| 2011/0288964 A1* | 11/2011 | Linder et al. ............. 700/259 |
| 2011/0289455 A1* | 11/2011 | Reville et al. ............. 715/830 |

(56) References Cited

U.S. PATENT DOCUMENTS

| | | | |
|---|---|---|---|
| 2011/0289456 A1* | 11/2011 | Reville et al. ............... 715/830 |
| 2011/0293180 A1* | 12/2011 | Criminisi et al. ............ 382/173 |
| 2011/0296353 A1* | 12/2011 | Ahmed et al. ............... 715/848 |
| 2011/0298827 A1* | 12/2011 | Perez ................. G06K 9/00355 345/647 |
| 2011/0300929 A1* | 12/2011 | Tardif ................... A63F 13/63 463/30 |
| 2011/0301934 A1* | 12/2011 | Tardif ................... G06F 3/017 704/1 |
| 2011/0302293 A1* | 12/2011 | Buban ................... G06F 3/011 709/224 |
| 2011/0304532 A1* | 12/2011 | Suh et al. ..................... 345/156 |
| 2011/0310125 A1* | 12/2011 | McEldowney ......... G06F 3/017 345/660 |
| 2011/0311144 A1* | 12/2011 | Tardif ................... G10L 15/25 382/195 |
| 2011/0313768 A1* | 12/2011 | Klein et al. .................. 704/251 |
| 2011/0314381 A1* | 12/2011 | Fuller ................... G06F 3/017 715/727 |
| 2011/0317871 A1* | 12/2011 | Tossell ............. G06K 9/00369 382/103 |
| 2012/0047468 A1* | 2/2012 | Santos et al. ............... 715/863 |
| 2012/0050157 A1* | 3/2012 | Latta et al. ................. 345/156 |
| 2012/0050502 A1* | 3/2012 | Chi et al. ....................... 348/51 |
| 2012/0051588 A1* | 3/2012 | McEldowney ........ G03B 17/54 382/103 |
| 2012/0052942 A1* | 3/2012 | Esaki et al. ..................... 463/31 |
| 2012/0053015 A1* | 3/2012 | Esaki et al. ....................... 482/8 |
| 2012/0056800 A1* | 3/2012 | Williams ................ G06F 3/011 345/156 |
| 2012/0057753 A1* | 3/2012 | Lee et al. ...................... 382/103 |
| 2012/0063637 A1* | 3/2012 | Tardif ................... G06T 11/00 382/103 |
| 2012/0075534 A1* | 3/2012 | Katz et al. ................... 348/602 |
| 2012/0086659 A1* | 4/2012 | Perlin ................... G06F 3/005 345/173 |
| 2012/0093481 A1* | 4/2012 | McDowell et al. .......... 386/241 |
| 2012/0105473 A1* | 5/2012 | Bar-Zeev ............... G06F 3/012 345/633 |
| 2012/0105585 A1* | 5/2012 | Masalkar ........... H04N 13/0022 348/46 |
| 2012/0110456 A1* | 5/2012 | Larco ...................... G06F 3/167 715/728 |
| 2012/0114194 A1* | 5/2012 | Kim et al. ..................... 382/115 |
| 2012/0119985 A1* | 5/2012 | Kang ............................. 345/156 |
| 2012/0119987 A1* | 5/2012 | Im et al. ........................ 345/156 |
| 2012/0120271 A1* | 5/2012 | Park et al. .................. 348/222.1 |
| 2012/0124525 A1* | 5/2012 | Kang ............................. 715/863 |
| 2012/0127062 A1* | 5/2012 | Bar-Zeev ................. G02B 3/14 345/6 |
| 2012/0128201 A1* | 5/2012 | Brickhill ............ G06K 9/00355 382/103 |
| 2012/0128208 A1* | 5/2012 | Leyvand et al. .............. 382/103 |
| 2012/0134575 A1* | 5/2012 | Mathe ........................... 382/154 |
| 2012/0150650 A1* | 6/2012 | Zahand ............. G06Q 30/0251 705/14.58 |
| 2012/0154542 A1* | 6/2012 | Katz et al. ...................... 348/47 |
| 2012/0155705 A1* | 6/2012 | Latta ..................... G06F 3/017 382/103 |
| 2012/0157198 A1* | 6/2012 | Latta ..................... A63F 13/803 463/31 |
| 2012/0157203 A1* | 6/2012 | Latta ..................... G06F 3/005 463/32 |
| 2012/0157208 A1* | 6/2012 | Reville ................... G06F 3/017 463/39 |
| 2012/0159290 A1* | 6/2012 | Pulsipher ........... G06K 9/00369 714/819 |
| 2012/0159327 A1* | 6/2012 | Law et al. .................... 715/716 |
| 2012/0163669 A1* | 6/2012 | Mathe et al. .................. 382/103 |
| 2012/0165096 A1* | 6/2012 | Geisner et al. ................ 463/36 |
| 2012/0165097 A1* | 6/2012 | Leyvand et al. ............... 463/36 |
| 2012/0165964 A1* | 6/2012 | Flaks ..................... G06F 3/011 700/94 |
| 2012/0173018 A1* | 7/2012 | Allen et al. ................... 700/245 |
| 2012/0177254 A1* | 7/2012 | Lee et al. ...................... 382/107 |
| 2012/0182392 A1* | 7/2012 | Kearns et al. .................. 348/46 |
| 2012/0185094 A1* | 7/2012 | Rosenstein et al. .......... 700/259 |
| 2012/0185095 A1* | 7/2012 | Rosenstein et al. .......... 700/259 |
| 2012/0185096 A1* | 7/2012 | Rosenstein et al. .......... 700/259 |
| 2012/0197439 A1* | 8/2012 | Wang et al. ................... 700/259 |
| 2012/0197464 A1* | 8/2012 | Wang et al. ...................... 701/2 |
| 2012/0198353 A1* | 8/2012 | Lee et al. ...................... 715/748 |
| 2012/0201424 A1* | 8/2012 | Masalkar ................ G06F 3/005 382/106 |
| 2012/0206051 A1* | 8/2012 | Nieuwlands ....... H05B 37/0227 315/153 |
| 2012/0206345 A1* | 8/2012 | Langridge ............... G06F 3/017 345/157 |
| 2012/0218395 A1* | 8/2012 | Andersen ................ G06F 3/017 348/77 |
| 2012/0223885 A1* | 9/2012 | Perez ...................... G06F 3/011 345/158 |
| 2012/0225719 A1* | 9/2012 | Nowozin ............ G06K 9/00342 463/36 |
| 2012/0229381 A1* | 9/2012 | Langridge ............... G06F 3/011 345/158 |
| 2012/0235903 A1* | 9/2012 | Im .................................. 345/158 |
| 2012/0239196 A1* | 9/2012 | Olivier et al. ................. 700/259 |
| 2012/0242800 A1* | 9/2012 | Ionescu .................. G06F 3/017 348/46 |
| 2012/0257020 A1* | 10/2012 | Yee et al. ......................... 348/46 |
| 2012/0262574 A1* | 10/2012 | Park et al. ..................... 348/143 |
| 2012/0268372 A1* | 10/2012 | Park et al. ..................... 345/158 |
| 2012/0268424 A1* | 10/2012 | Kim et al. ..................... 345/175 |
| 2012/0274745 A1* | 11/2012 | Russell .......................... 348/46 |
| 2012/0276994 A1* | 11/2012 | Lansdale ................. A63F 13/10 463/31 |
| 2012/0276995 A1* | 11/2012 | Lansdale ................. A63F 13/42 463/31 |
| 2012/0277001 A1* | 11/2012 | Lansdale ............... A63F 13/213 463/39 |
| 2012/0278904 A1* | 11/2012 | Perez ...................... G06F 21/10 726/31 |
| 2012/0287038 A1* | 11/2012 | Mathe et al. .................. 345/156 |
| 2012/0293518 A1* | 11/2012 | Geisner et al. ............... 345/474 |
| 2012/0295661 A1* | 11/2012 | Kim et al. .................. 455/556.1 |
| 2012/0300024 A1* | 11/2012 | McEldowney ......... G06F 3/011 348/42 |
| 2012/0300040 A1* | 11/2012 | McEldowney ..... H04N 13/0271 348/49 |
| 2012/0308140 A1* | 12/2012 | Ambrus ............. G06K 9/00362 382/190 |
| 2012/0309477 A1* | 12/2012 | Mayles ................ A63F 13/5258 463/3 |
| 2012/0309532 A1* | 12/2012 | Ambrus .................. G06F 3/0425 463/36 |
| 2012/0311503 A1* | 12/2012 | Preston .................. G06F 3/017 715/850 |
| 2012/0314031 A1* | 12/2012 | Shotton .............. H04N 13/0203 348/46 |
| 2012/0320080 A1* | 12/2012 | Giese et al. ................... 345/619 |
| 2012/0327077 A1* | 12/2012 | Tung ............................ 345/419 |
| 2012/0327078 A1* | 12/2012 | Liao et al. .................... 345/419 |
| 2012/0327089 A1* | 12/2012 | Lee et al. ..................... 345/473 |
| 2012/0327125 A1* | 12/2012 | Kutliroff ................ G06F 3/017 345/660 |
| 2013/0007668 A1* | 1/2013 | Liu et al. ...................... 715/841 |
| 2013/0009861 A1* | 1/2013 | Valik et al. ................... 345/156 |
| 2013/0009865 A1* | 1/2013 | Valik et al. ................... 345/156 |
| 2013/0010071 A1* | 1/2013 | Valik et al. ..................... 348/46 |
| 2013/0021373 A1* | 1/2013 | Vaught ................. G02B 27/017 345/633 |
| 2013/0027296 A1* | 1/2013 | Klein et al. ................... 345/156 |
| 2013/0042296 A1* | 2/2013 | Hastings et al. .................. 726/1 |
| 2013/0044249 A1* | 2/2013 | Ledbetter ................ H04N 5/2256 348/333.01 |
| 2013/0050425 A1* | 2/2013 | Im et al. .......................... 348/46 |
| 2013/0050426 A1* | 2/2013 | Sarmast .................... G01S 17/89 348/46 |

(56) References Cited

U.S. PATENT DOCUMENTS

| | | | |
|---|---|---|---|
| 2013/0066526 A1* | 3/2013 | Mondragon | G09G 5/00 701/48 |
| 2013/0069862 A1* | 3/2013 | Ur | 345/156 |
| 2013/0069931 A1* | 3/2013 | Wilson | G06F 1/1694 345/419 |
| 2013/0070056 A1* | 3/2013 | Tripathi | 348/46 |
| 2013/0070058 A1* | 3/2013 | Lee et al. | 348/46 |
| 2013/0074002 A1* | 3/2013 | Markovic et al. | 715/781 |
| 2013/0077059 A1* | 3/2013 | Marti | H04N 9/3185 353/69 |
| 2013/0083063 A1* | 4/2013 | Geisner | G06T 19/006 345/633 |
| 2013/0084970 A1* | 4/2013 | Geisner et al. | 463/29 |
| 2013/0084981 A1* | 4/2013 | Zalewski | A63F 9/24 463/36 |
| 2013/0100129 A1* | 4/2013 | Mathe | 345/419 |
| 2013/0101207 A1* | 4/2013 | Mathe et al. | 382/154 |
| 2013/0106994 A1* | 5/2013 | Sharp | G06K 9/00362 348/43 |
| 2013/0113956 A1* | 5/2013 | Anderson et al. | 348/223.1 |
| 2013/0127980 A1* | 5/2013 | Haddick | G06F 3/013 348/14.08 |
| 2013/0129155 A1* | 5/2013 | Lee et al. | 382/107 |
| 2013/0129169 A1* | 5/2013 | Mathe et al. | 382/128 |
| 2013/0129224 A1* | 5/2013 | Katz et al. | 382/199 |
| 2013/0129227 A1* | 5/2013 | Mathe et al. | 382/203 |
| 2013/0129230 A1* | 5/2013 | Shotton | G06T 7/0046 382/218 |
| 2013/0132095 A1* | 5/2013 | Murthi | G06F 1/3234 704/275 |
| 2013/0187929 A1* | 7/2013 | Perez et al. | 345/473 |
| 2013/0215235 A1* | 8/2013 | Russell | 348/47 |
| 2013/0243257 A1* | 9/2013 | Lee et al. | 382/103 |
| 2013/0321265 A1* | 12/2013 | Bychkov et al. | 345/156 |
| 2013/0321271 A1* | 12/2013 | Bychkov et al. | 345/158 |
| 2013/0325244 A1* | 12/2013 | Wang et al. | 701/26 |
| 2013/0328763 A1* | 12/2013 | Latta et al. | 345/156 |
| 2013/0329011 A1* | 12/2013 | Lee et al. | 348/46 |
| 2014/0006997 A1* | 1/2014 | Kim et al. | 715/773 |
| 2014/0007009 A1* | 1/2014 | Kulusky et al. | 715/810 |
| 2014/0019165 A1* | 1/2014 | Horseman | 705/3 |
| 2014/0022161 A1* | 1/2014 | Leyvand et al. | 345/156 |
| 2014/0028548 A1* | 1/2014 | Bychkov et al. | 345/156 |
| 2014/0078312 A1* | 3/2014 | Zalewski | A63F 13/04 348/169 |
| 2014/0080428 A1* | 3/2014 | Rhoads | G06F 17/30241 455/88 |
| 2014/0094307 A1* | 4/2014 | Doolittle et al. | 463/36 |
| 2015/0234475 A1* | 8/2015 | Latta | G06F 3/017 345/156 |

OTHER PUBLICATIONS

Chen, C.-P.; Chen, Y.-T.; Lee, P.-H.; Tsai, Y.-P. and Lei, S., "Real-Time Hand Tracking on Depth Images", Nov. 6-9, 2011, 2011 IEEE Visual Communications and Image Processing (VCIP), p. 1-4.*

Shiratuddin, M.F. and Wong, K.W., "Non-Contact Multi-Hand Gestures Interaction Techniques for Architectural Design in a Virtual Environment", Nov. 14-16, 2011, Processings of the 5th International Conference on IT and Multimedia at UNITEN (ICIMU 2011).*

Hung, C.-H. and Bai, Y.-W., "Halftone Control Method in White Light LEDS by Using an Embedded Remote Controller with Zigbee Communication", May 2-5, 2010, 2010 23rd Canadian Conference on Electrical and Computer Engineering (CCECE).*

Ionescu, D.; Ionescu, B.; Gadea, C. and Islam, S., "An Intelligent Gesture Interface for Controlling TV Sets and Set-Top Boxes", May 19-21, 2011, 6th IEEE International Symposium on Applied Computational Intelligence and Informatics.*

Segen, J. and Kumar, S., "Shadow Gestures: 3D Hand Pose Estimation Using a Single Camera", Jun. 23-25, 1999, IEEE Computer Society Conference on Computer Vision and Pattern Recognition, vol. 1.*

Yahav, G.; Iddan, G.J. and Mandelboum, D., "3D Imaging Camera for Gaming Application", Jan. 10-14, 2007, 2007 International Conference on Consumer Electronics (ICCE 2007), Digest of Technical Papers.*

Qian, G.; Guo, F.; Ingalls, T.; Olson, L.; James, J. and Rikakis, T., "A Gesture-Driven Multimodal interactive Dance System", 2004, 2004 IEEE International Conference on Multimedia and Expo (ICME).*

Baldauf, M. and Frohlich, P., "Supporting Hand Gesture Manipulation of Projected Content with Mobile Phones", 2009, Proceedings of the Workshop on Mobile Interaction with the Real World (WIRW).*

Freeman, W.T. and Weissman, C.D., "Television Control by Hand Gestures", Dec. 1994, Mitsubishi Electric Research Laboratories, TR94-24.*

Hongo, H.; Ohya, M.; Yasumoto, M.; Niwa, Y. and Yamamoto, K., "Focus of Attention for Face and Hand Gesture Recognition Using Multiple Cameras", 2000, Proceedings of the 4$^{th}$ IEEE International Conference on Automatic Face and Gesture Recognition.*

Kohler, M., "Special Topics of Gesture Recognition Applied in Intelligent Home Environments", 1998, Proceedings of the Gesture Workshop, p. 285-296.*

Kohler, M., "Technical Details and Ergonomical Aspects of Gesture Recognition Applied in Intelligent Home Environments", 1997.*

Pavlovic, V.I.; Sharma, R.; and Huang, T.S., "Visual Interpretation of Hand Gestures for Human-Computer Interaction: A Review", Jul. 1997, IEEE Transactions on Pattern Analysis and Machine Intelligence, vol. 19, No. 7.*

Cai, Q. and Aggarwal, J.K., "Tracking Human Motion Using Multiple Cameras", Proceedings of the 13$^{th}$ Intl Conf on Pattern Recognition, Aug. 1996, pp. 68-72, vol. 3.*

Chen, M.-Y.; Mummert, L.; Pillai, P.; Hauptmann, A. and Sukthankar, R., "Controlling Your TV with Gestures", Mar. 2010, MIR 2010.*

Jun, Z.; Fangwen, Z.; Jiaqi, W.; Zhengpeng, Y. and Jinbo, C., "3D Hand Gesture Analysis Based on Multi-Criterion in Multi-Camera System", Sep. 2008, Proceedings of the IEEE Intl Conf on Automation and Logistics.*

Kuch, J.J. and Huang, T.S., "Vision Based Hand Modeling and Tracking for Virtual Teleconferencing and Telecollaboration", Jun. 1995, Proceedings of the 5$^{th}$ Intl Conf on Computer Vision, pp. 666-671.*

Dias, J.M.S.; Nande, P.; Barata, N. and Correia, A., "O.G.R.E.—Open Gestures Recognition Engine", 2004, Proceedings of the XVII Brazilian Symposium on Computer Graphics and Image Processing (SIBGRAPI '04).*

"Examination Report Received for European Patent Application No. 12192363.5", Mailed Date: Jun. 12, 2014, Filed Date: Nov. 13, 2012, 5 Pages.

"Search Report Received for European Patent Application No. 12192363.5", Mailed Date: May 26, 2014, Filed Date: Nov. 13, 2012, 3 Pages.

Response to European Office Action dated Jul. 10, 2014, European Patent Application No. 12192363.5.

Examination Report dated Aug. 21, 2014, European Patent Application No. 12192363.5.

Response to European Office Action dated Oct. 1, 2014, European Patent Application No. 12192363.5.

Ionescu, et al., "An Intelligent gesture interface for contorlling TV sets and set-top boxes," Applied Computational Intelligence and Informatics (SACI), 2011 6th IEEE International Symposium on IEEE, May 19, 2011, pp. 159-164.

* cited by examiner

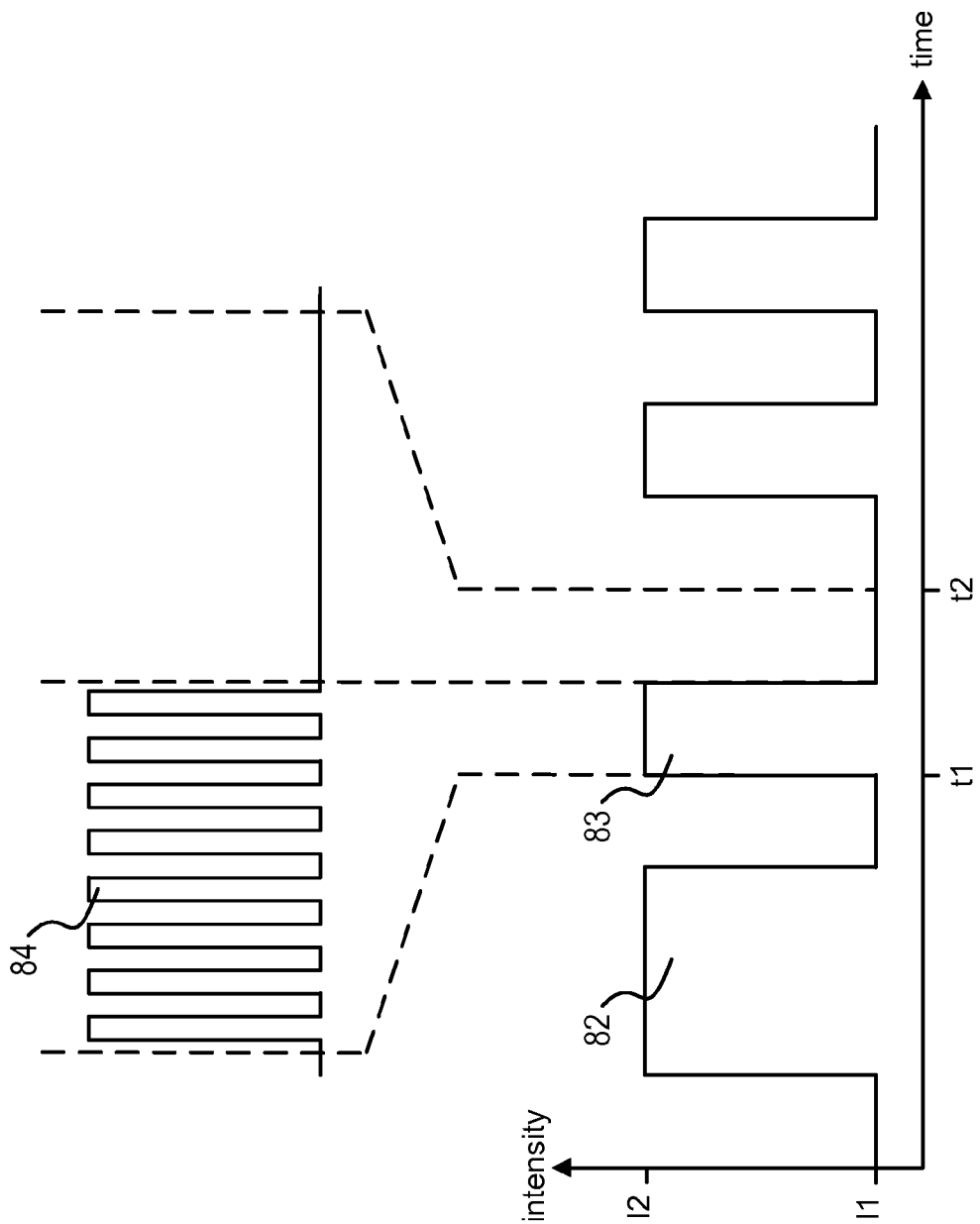

METHODS FOR CONTROLLING ELECTRONIC DEVICES USING GESTURES

BACKGROUND

Remote controls are commonly used for controlling various consumer electronic devices, such as televisions and stereo systems, from a distance. As an example, the ubiquitous television remote control comprises a wireless handheld device with buttons for adjusting various television settings such as the television channel and volume. The typical procedure for controlling a consumer electronic device using a remote control is to point the remote control in the direction of the consumer electronic device and then to wirelessly transmit various device commands to the consumer electronic device via the selection of various buttons on the remote control.

Most remote controls transmit infrared (IR) signals or radio-frequency (RF) signals in order to control the remote consumer electronic devices. Many different infrared transmission protocols exist. One infrared transmission protocol is the NEC IR transmission protocol, which uses pulse distance encoding of the message bits. Another infrared transmission protocol is the RC-5 protocol, which provides a one-way protocol for transmitting device commands to a consumer electronic device. In the case of the RC-5 protocol, the remote control typically includes a transmitter IC driving an IR emitter source (e.g., an IR LED) for generating an IR signal. The remote control transmits the IR signal including the device commands via a Manchester coded bitstream modulating a 36-40 kHz carrier signal. The transmitted IR signal is then detected by an IR enabled consumer electronic device using an IR light sensor (e.g., a photodiode or phototransistor) and demodulated such that the consumer electronic device can act in accordance with the received device commands.

Universal remote controls have been developed to consolidate a large number of different remote controls, due to different IR transmission protocols used by various consumer electronic device manufacturers and the fact that each consumer electronic device is typically shipped with its own remote control, into a single universal remote control. A universal remote control may be programmed to control many different consumer electronic devices utilizing different IR transmission protocols. For example, a single universal remote control may be configured to control a television, a VCR, a DVD player, and a stereo system.

SUMMARY

Technology is described for controlling infrared (IR) enabled devices by projecting coded IR pulses from an active illumination depth camera. In some embodiments, a gesture recognition system includes an active illumination depth camera such as a depth camera that utilizes time-of-flight (TOF) or structured light techniques for obtaining depth information. The gesture recognition system may detect the performance of a particular gesture associated with a particular electronic device, determine a set of device instructions in response to detecting the particular gesture, and transmit the set of device instructions to the particular electronic device utilizing coded IR pulses. The coded IR pulses may imitate the IR pulses associated with a remote control protocol. In some cases, the coded IR pulses transmitted may also be used by the active illumination depth camera for determining depth information.

One embodiment includes detecting an end user command associated with one or more electronic devices, determining one or more device instructions for communicating with the one or more electronic devices based on the end user command, and projecting a sequence of light patterns originating from an active illumination depth camera into an environment. The sequence of light patterns includes one or more coded light pulses associated with the one or more device instructions.

One embodiment includes an active illumination depth camera and one or more processors. The active illumination depth camera captures a first image of an environment. The one or more processors detect an end user command based on at least the first image, determine one or more device instructions for communicating with the one or more electronic devices, and direct the active illumination depth camera to project a sequence of light patterns into the environment. The sequence of light patterns includes one or more coded IR pulses associated with the one or more device instructions.

One embodiment includes detecting a particular gesture associated with the one or more electronic devices, determining a particular electronic device of the one or more electronic devices based on a direction of motion associated with the particular gesture, determining one or more device instructions for controlling the particular electronic device, and modulating one or more light patterns projected from an active illumination depth camera. The modulating one or more light patterns generates one or more coded IR pulses associated with the one or more device instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 depicts one example of a sequence of IR light pulses projected over time from a capture device.

DETAILED DESCRIPTION

Technology is described for controlling infrared (IR) enabled devices by projecting coded IR pulses from an active illumination depth camera. In some embodiments, a gesture recognition system includes an active illumination depth camera such as a depth camera that utilizes time-of-flight (TOF) or structured light techniques for obtaining depth information. The gesture recognition system may detect the performance of a particular gesture associated with a particular electronic device, determine a set of device instructions in response to detecting the particular gesture, and transmit the set of device instructions to the particular electronic device utilizing coded IR pulses. The coded IR pulses may imitate the IR pulses associated with a remote control protocol. In some cases, the coded IR pulses transmitted may also be used by the active illumination depth camera for determining depth information.

One issue involving controlling infrared (IR) enabled devices using a natural user interface relates to how to control older IR devices (e.g., older televisions and VCR players) without requiring hardware or firmware upgrades to the older IR devices (i.e., how to provide backward compatibility in the presence of a natural user interface). In particular, current home entertainment and gaming systems may utilize gesture recognition techniques for controlling system and application user interfaces and therefore an end user of these systems no longer requires use of a physical remote control (i.e., home entertainment systems utilizing a natural user interface eliminate the need for a physical remote control). Thus, there is a need for computing environments utilizing a natural user interface to be able to control IR enabled devices without requiring hardware or firmware upgrades to the IR enabled devices.

For purposes of this document, the term "light" may refer to any sort of optical radiation including visible light, infrared light, and ultraviolet light.

Figure 1:
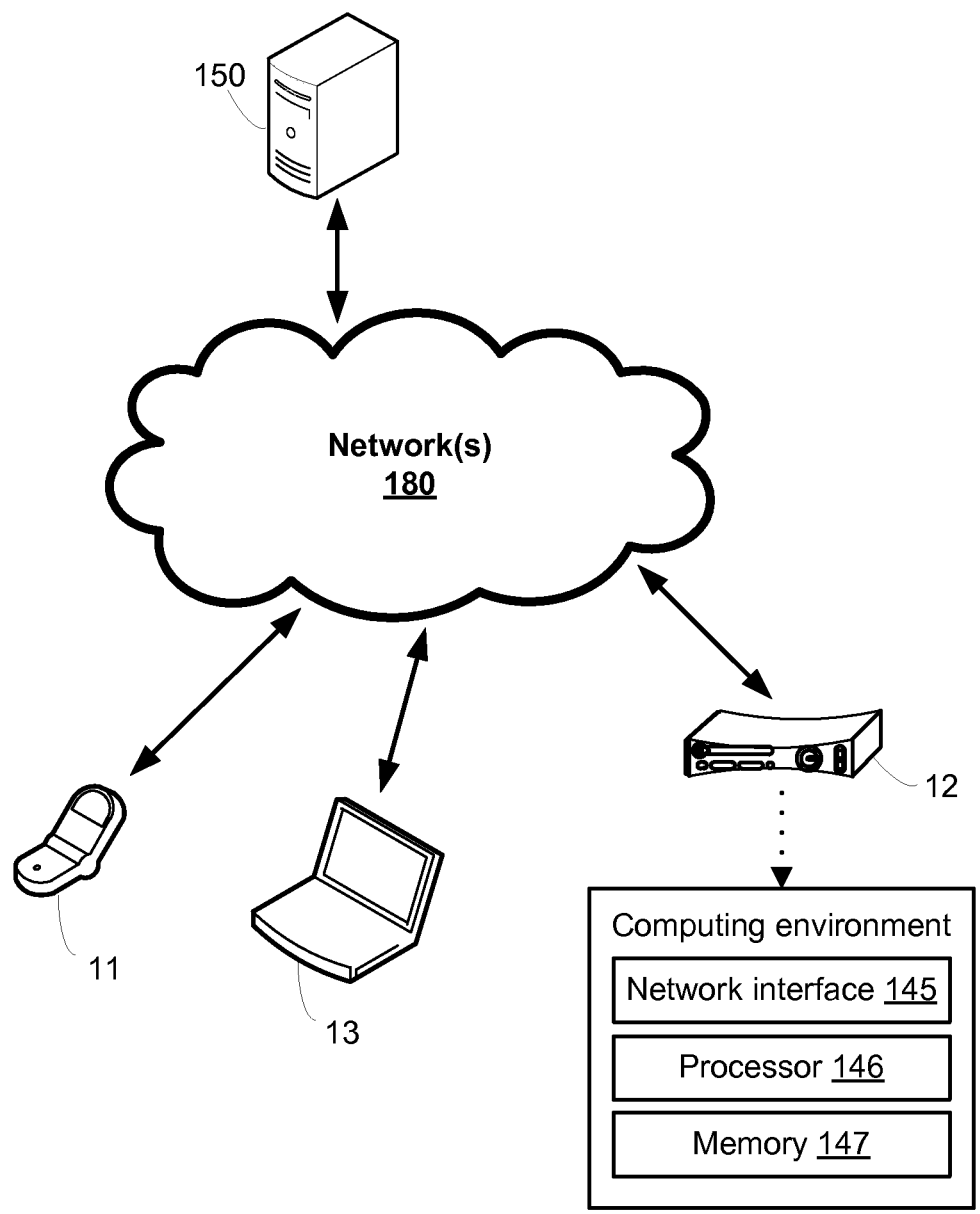
FIG. 1 is a block diagram of one embodiment of a networked computing environment in which the disclosed technology may be practiced.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, computing environment 12, mobile device 13, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of computing environment 12 includes a network interface 145, processor 146, and memory 147, all in communication with each other. Network interface 145 allows computing environment 12 to connect to one or more networks 180. Network interface 145 may include a wireless network interface, a modem, and/or a wired network interface. Processor 146 allows computing environment 12 to execute computer readable instructions stored in memory 147 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one embodiment, computing environment 12 includes a unified gesture and voice recognition engine or other natural user interface engine for controlling one or more IR enabled devices without requiring hardware or firmware upgrades to the one or more IR enabled devices. The natural user interface engine may acquire one or more sensor inputs from one or more sensing devices. The one or more sensor inputs may provide sensing information necessary to infer the intent of an end user interacting with the computing environment (e.g., that the end user has performed a particular gesture in order to control a game console or another electronic device). The one or more sensing devices may include, for example, one or more depth sensors, image sensors, IR sensors, inertial measurement units (IMUS), inward facing eye tracking systems, and microphones.

In some embodiments, computing environment 12 may be in communication with a server in the cloud, such as application server 150, and may request and receive from the server one or more IR transmission protocols associated with one or more IR enabled electronic devices to be controlled by the computing environment 12.

Figure 2:
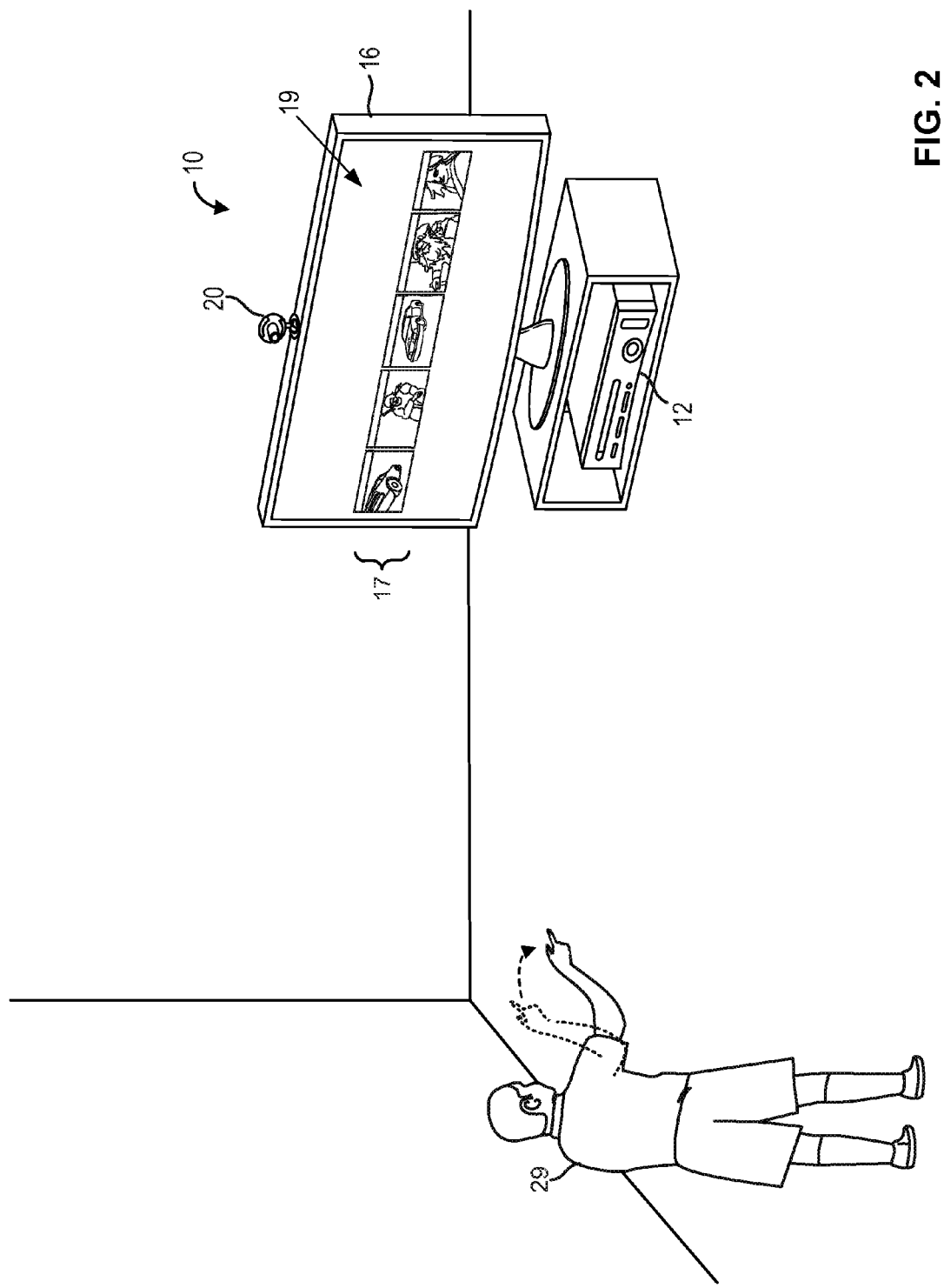
FIG. 2 depicts one embodiment of a computing system utilizing a natural user interface.

FIG. 2 depicts one embodiment of a computing system 10 utilizing a natural user interface. The computing system 10 may include a computing environment 12, a capture device 20, and a display 16, all in communication with each other. Computing environment 12 may include one or more processors. Capture device 20 may include one or more color or depth sensing cameras that may be used to visually monitor one or more targets including humans and one or more other real objects within a particular environment. Capture device 20 may also include a microphone. In one example, capture device 20 may include a depth sensing camera and a microphone and computing environment 12 may comprise a gaming console.

In some embodiments, the capture device 20 may include an active illumination depth camera, which may use a variety of techniques in order to generate a depth map of an environment or to otherwise obtain depth information associated the environment including the distances to objects within the environment from a particular reference point. The techniques for generating depth information may include structured light illumination techniques and time of flight (TOF) techniques.

Structured light illumination involves projecting a light pattern into an environment, capturing an image of the reflected light pattern, and then determining distance information from the spacings and/or distortions associated with the reflected light pattern relative to the projected light pattern. The light pattern may be projected using light that is invisible to the naked eye (e.g., IR or UV light) and may comprise a single dot, a single line, or a variety of dimensional patterns (e.g., horizontal and vertical lines, or checkerboard patterns). In some cases, several different light patterns may be necessary to generate accurate depth information.

Time of flight techniques may determine distances to objects within an environment by timing how long it takes for light transmitted from a light source to travel to the objects and reflect back to an image sensor. In some cases, a short light pulse (or series of light pulses) may be projected into the environment at a first point in time and reflections associated with the short light pulse may be captured at a second point in time after the first point in time. A time of flight system may adjust the time difference between the first point in time and the second point in time in order to detect objects at a particular distance (or over a range of distances) associated with the time difference.

As depicted in FIG. 2, a user interface 19 is displayed on display 16 such that an end user 29 of the computing system 10 may control a computing application running on computing environment 12. The user interface 19 includes images 17 representing user selectable icons. In one embodiment, computing system 10 detects a particular gesture performed by end user 29 and executes a new computing application in response to the particular gesture being detected. The particular gesture may include selection of one of the user selectable icons. In another embodiment, computing system 10 detects a particular gesture performed by end user 29 and projects one or more IR commands based on the particular gesture in order to control one or more IR enabled electronic devices. For example, the particular gesture performed by end user 29 may cause a stereo system to turn on and to select a particular audio channel.

Figure 3:
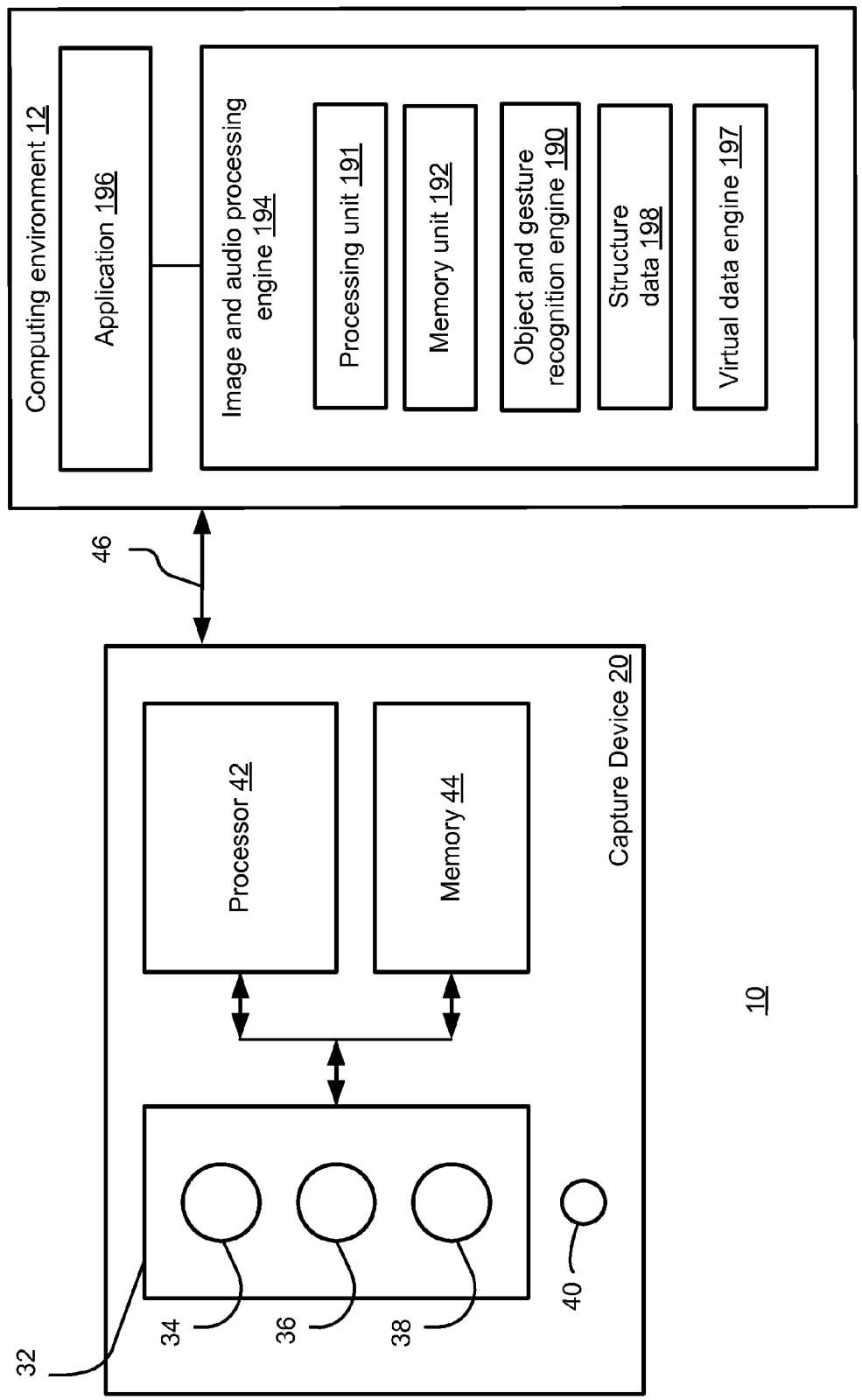
FIG. 3 illustrates one embodiment of computing system including a capture device and computing environment.

FIG. 3 illustrates one embodiment of computing system 10 including a capture device 20 and computing environment 12. In some embodiments, capture device 20 and computing environment 12 may be integrated within a single computing device. The single computing device may be a mobile device, such as mobile device 11 in FIG. 1.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting objects and performing gesture recognition can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 4:
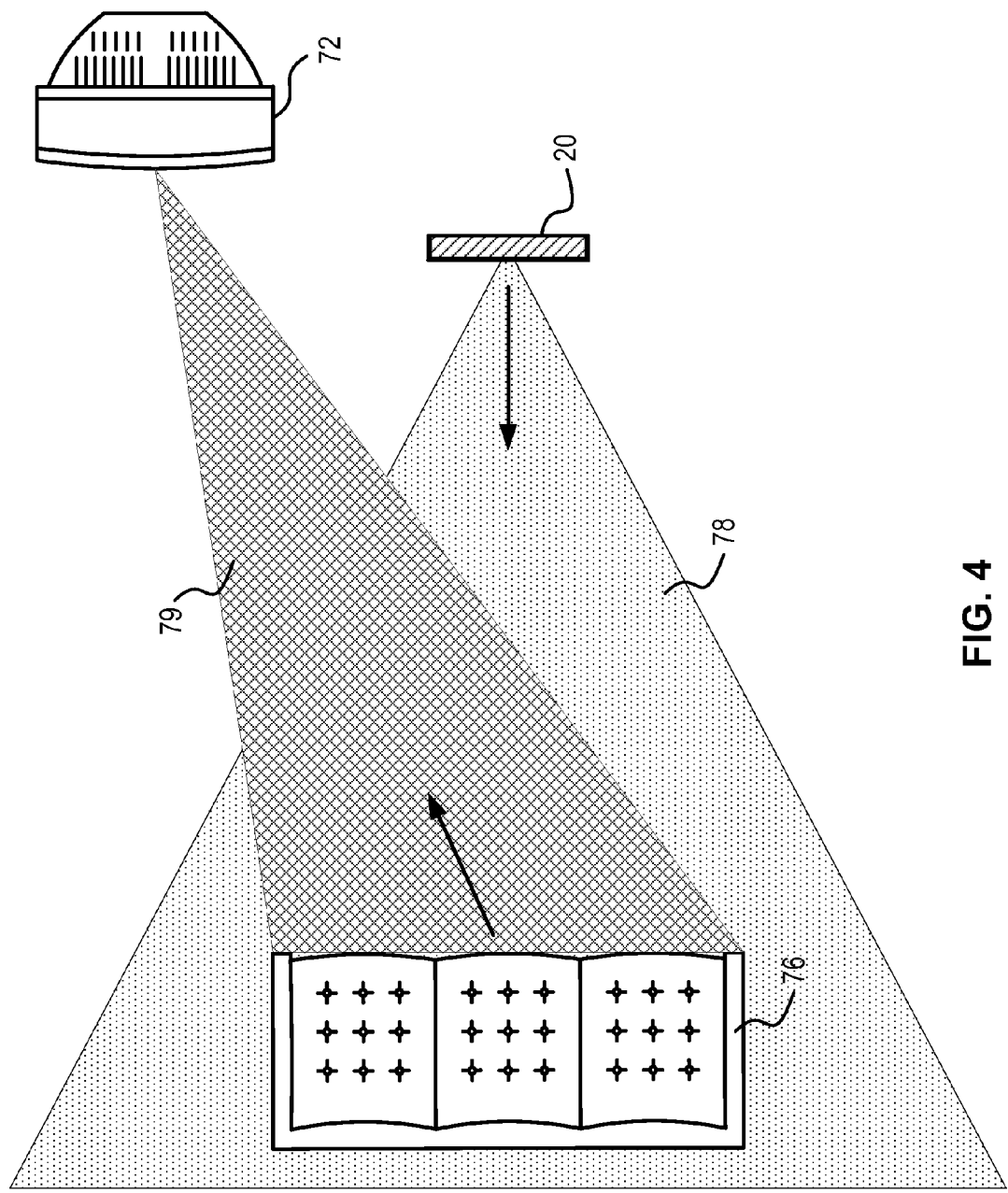
FIG. 4 depicts one embodiment of an environment including a capture device, a reflecting object, and an old television.

FIG. 4 depicts one embodiment of an environment including a capture device 20, a reflecting object 76, and an old television 72. The reflecting object 76 comprises a couch.

The old television 72 comprises an IR enabled electronic device. As depicted, capture device 20 projects light 78 associated with a light pattern into the environment. The projected light 78 may comprise IR signals, RF signals, or other electromagnetic signals not visible to the human eye. Light 78 that is reflected from reflecting object 76 and directed towards the old television 72 comprises reflected light 79. Other objects within the environment not depicted may also reflect light towards the old television 72. For example, walls and people within the environment may also reflect light projected from capture device 20.

In one embodiment, reflected light 79 received by the old television 72 may include one or more IR commands for controlling the old television 72. In this case, capture device 20 may rely on the reflections of the project light 78 typically used for obtaining depth information of the environment in order to control IR enabled electronic devices that are located in front of or even behind capture device 20.

In some embodiments, capture device 20 may include an intensive IR illumination source for projecting pulses of IR light that are then reflected or otherwise bounced back from objects within an environment in order to determine depth information. The intensive IR illumination source allows capture device 20 to detect reflected light over a large field of view within the environment. This is in contrast to the typical remote control which requires an end user to point the remote control towards an IR enabled device in order to control the IR enabled device. Because of the power limitations of the typical remote control, the typical IR enabled device has a large field of view and integrates light received from many different points within the environment so that the typical remote control may be pointed towards the typical IR enabled device from the many different points within the environment. Using the fact that the typical IR enabled device integrates light received over a large field of view, the capture device 20 may project light into an environment and control typical IR enabled devices via reflected light. While the intensity of the reflected light at each point in the environment may be low, the integration of all of the reflected light projected from the capture device 20 and received at the typical IR enabled device may be substantial.

FIG. 5 depicts one example of a sequence of IR light pulses projected over time from a capture device, such as capture device 20 in FIG. 4. The sequence of light pulses vary in intensity from a low light intensity level I1 to a high light intensity level I2. A first light pulse 82 of the sequence of IR light pulses may be used by an IR enabled device to initiate or detect the start of one or more IR commands. Although the first light pulse 82 is depicted as a single solid light pulse, it may comprise one or more higher frequency light pulses. Because the typical IR enabled electronic device integrates received IR light over hundreds of microseconds, the one or more higher frequency light pulses will be detected as a single solid light pulse. As depicted, lower frequency light pulse 83 may comprise one or more higher frequency light pulses such as light pulse 84.

In one embodiment, the sequence of IR light pulses may comprise one or more coded IR pulses. The one or more coded IR pulses may comprise one or more IR commands for controlling IR enabled electronic devices. Each of the one or more higher frequency light pulses may be associated with a particular light pattern that is projected into an environment by a capture device, such as capture device 20 in FIG. 4. Each of the one or more higher frequency light pulses may be also used to obtain depth information associated with the environment. In one example, the time difference between time t1 and time t2 may be roughly 2 ms and the pulse width of light pulse 84 may be roughly 10 μs.

Figure 6A:
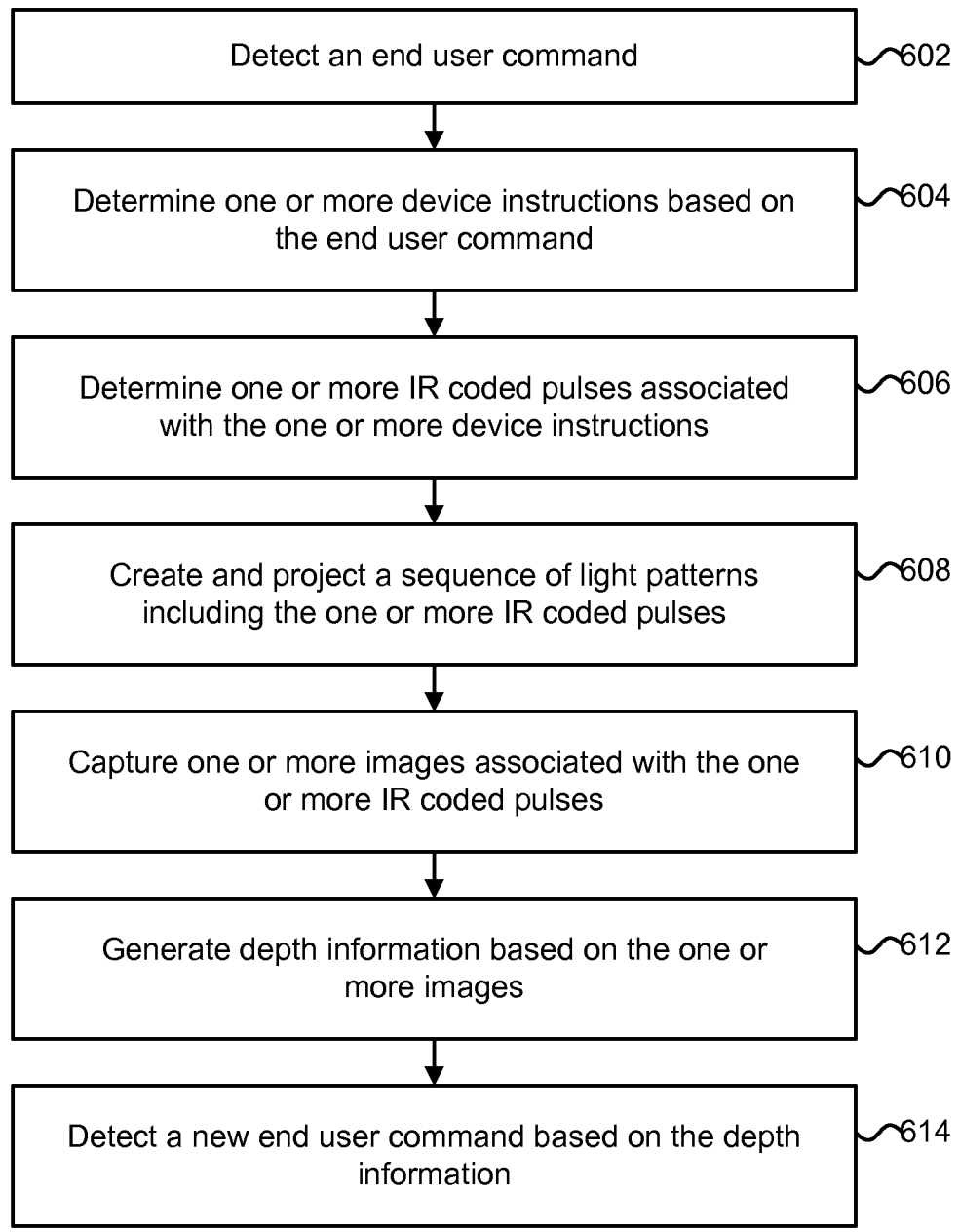
FIG. 6A is a flowchart describing one embodiment of a process for controlling one or more electronic devices using an active illumination depth camera.

FIG. 6A is a flowchart describing one embodiment of a process for controlling one or more electronic devices using an active illumination depth camera. The process of FIG. 6A may be performed continuously and by one or more computing devices. Each step in the process of FIG. 6A may be performed by the same or different computing devices as those used in other steps, and each step need not necessarily be performed by a single computing device. In one embodiment, the process of FIG. 6A is performed by a computing environment such as computing environment 12 in FIG. 1.

In step 602, an end user command is detected. The end user command may be detected by utilizing gesture recognition technology and/or voice recognition technology. In step 604, one or more device instructions based on the end user command are determined. The one or more device instructions may include instructions for controlling one or more IR enabled electronic devices. For example, the one or more device instructions may include instructions for turning on a television, selecting a television channel, and turning off a stereo system. The one or more device instructions may be determined by acquiring a predetermined set of device instructions associated with the end user command (e.g., by performing a table lookup based on the end user command or acquiring the one or more device instructions from a device instructions database).

In step 606, one or more IR coded pulses associated with the one or more device instructions are determined. The one or more IR coded pulses may be associated with one or more IR transmission protocols. Each of the one or more device instructions may map to a set of one or more IR coded pulses. For example, a device instruction for turning on a television may map to a sequence of IR commands (e.g., commands based on the RC-5 protocol or the NEC IR protocol).

In one embodiment, the one or more IR coded pulses may be automatically determined by automatically identifying an IR enabled electronic device within an environment, determining a particular IR transmission protocol associated with the IR enabled electronic device identified, and determining the one or more coded pulses based on the one or more device instructions and the particular IR transmission protocol for the IR enabled electronic device.

In step 608, a sequence of light patterns is created and projected from an active illumination depth camera. The sequence of light patterns include the one or more IR coded pulses determined in step 606. The sequence of light patterns may include a plurality of light patterns. The light patterns may be projected using light that is invisible to the naked eye (e.g., IR or UV light) and may comprise a single dot, a single line, or a variety of dimensional patterns (e.g., horizontal and vertical lines, or checkerboard patterns). The illumination intensity of the projected sequence of light patterns may be adjusted depending on environmental conditions, such as the presence of persons or other objects within an environment.

In step 610, one or more images associated with the one or more IR coded pulses projected are captured. In step 612, depth information based on the one or more images captured in step 610 is generated. In step 614, a new end user command based on the depth information generated in step 612 is detected. The process of detecting a new end user command may be similar to the process described in step 602 with respect to detecting an end user command.

Figure 6B:
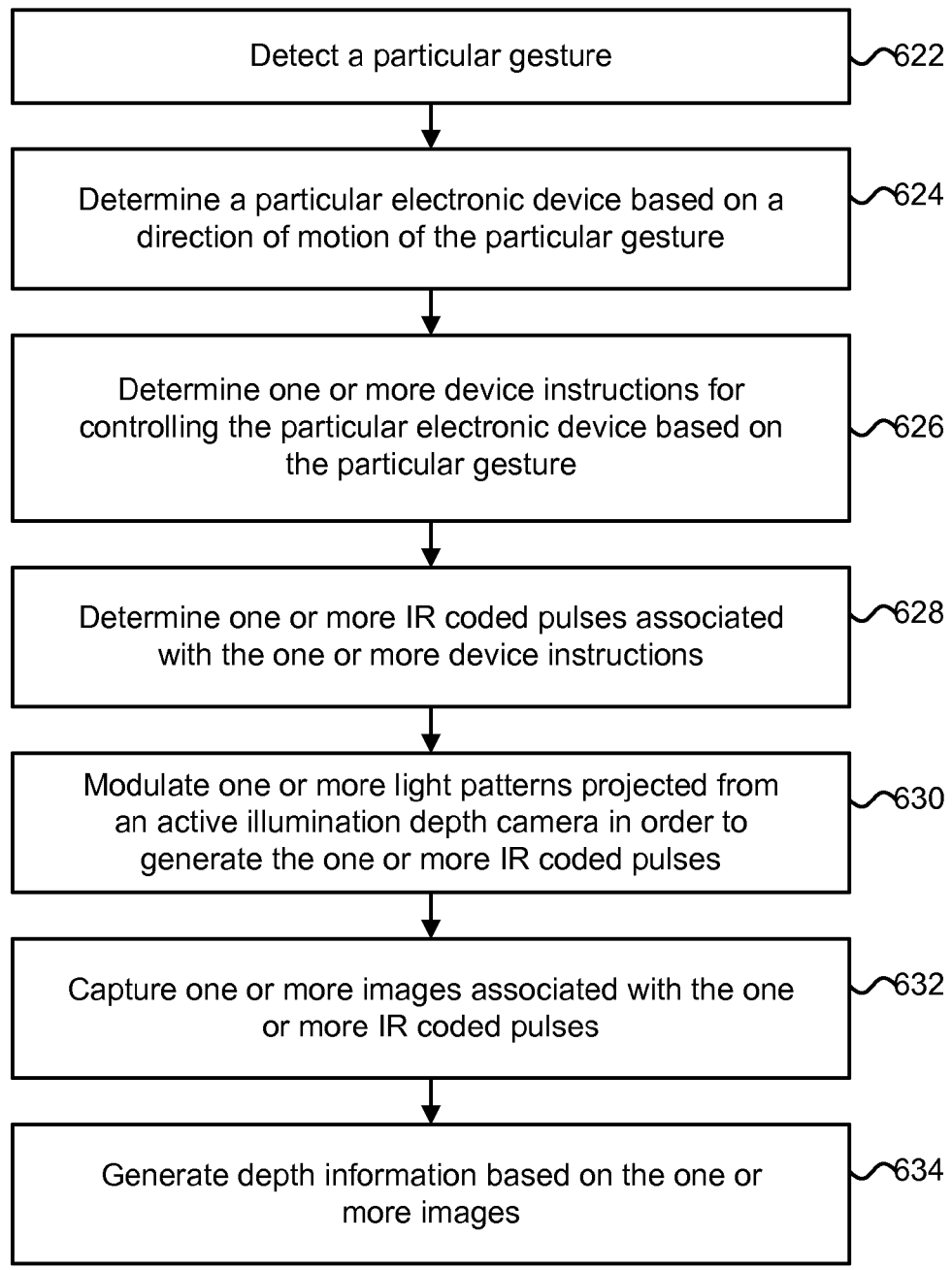
FIG. 6B is a flowchart describing an alternative embodiment of a process for controlling one or more electronic devices using an active illumination depth camera.

FIG. 6B is a flowchart describing an alternative embodiment of a process for controlling one or more electronic devices using an active illumination depth camera. The process of FIG. 6B may be performed continuously and by one or more computing devices. Each step in the process of FIG. 6B may be performed by the same or different computing devices as those used in other steps, and each step need not necessarily be performed by a single computing device. In one embodiment, the process of FIG. 6B is performed by a computing environment such as computing environment 12 in FIG. 1.

In step 622, a particular gesture is detected. The particular gesture may be detected via gesture recognition. In step 624, a particular electronic device based on a direction of motion of the particular gesture is determined. The direction of motion of the particular device may be determined using various gesture recognition techniques that utilize skeletal tracking. The direction of motion may be associated with a vector that is projected within an environment in order to determine the particular electronic device within the direction of motion.

In step 626, one or more device instructions for controlling the particular electronic device are determined. The one or more device instructions may be based on the particular gesture detected in step 622. In one example, an end user may point towards the particular electronic device and issue a voice command stating that the particular electronic device should be turned on. In another example, an end user may point towards the particular electronic device and issue a voice command stating an intent to watch a soccer game. In this case, the one or more instructions may include instructions for turning on a television, selecting a particular channel on the television, and adjusting a lighting condition of the environment in which the television exists.

In step 628, one or more IR coded pulses associated with the one or more device instructions are determined. The one or more IR coded pulses may be associated with one or more IR transmission protocols. Each of the one or more device instructions may map to a set of one or more IR coded pulses. For example, an instruction for turning on a television may map to a sequence of IR commands such as a sequence of IR commands based on the RC-5 protocol.

In one embodiment, the one or more IR coded pulses may be automatically determined by automatically identifying an IR enabled electronic device within an environment, determining a particular IR transmission protocol associated with the IR enabled electronic device identified, and determining the one or more coded pulses based on the one or more device instructions and the particular IR transmission protocol for the IR enabled electronic device.

In step 630, one or more light patterns projected from an active illumination depth camera are modulated in order to generate the one or more IR coded pulses. The one or more light patterns projected from the active illumination depth camera may comprise one or more light pulses used for determining depth information associated with an environment. In one embodiment, the one or more light patterns projected may be modulated by modulating an amplitude associated with the one or more light patterns projected from the active illumination depth camera. In another embodiment, the one or more light patterns projected may be modulated by modulating a frequency associated with the one or more light patterns projected from the active illumination depth camera. In step 632, one or more images associated with the one or more IR coded pulses are captured. In one example, one image is captured corresponding with a subset of the one or more IR coded pulses. In step 634, depth information based on the one or more images captured in step 632 is generated.

Figure 6C:
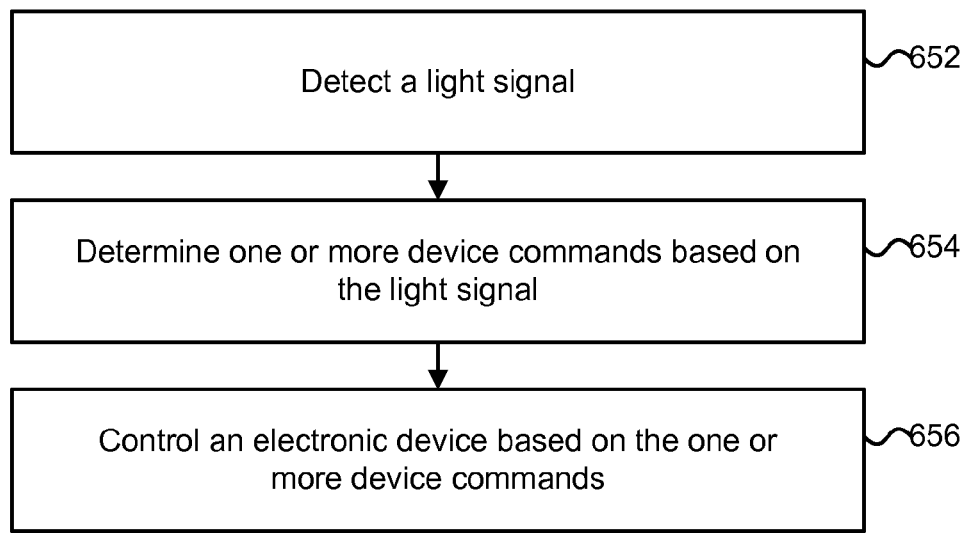
FIG. 6C is a flowchart describing one embodiment of a process for controlling an electronic device based on a detected light signal.

FIG. 6C is a flowchart describing one embodiment of a process for controlling an electronic device based on a detected light signal. In one embodiment, the process of FIG. 6C is performed by an IR enabled television such as old television 72 in FIG. 4. In step 652, a light signal is detected. The light signal may be detected via a light sensor such as a photodiode or phototransistor based device. In step 654, one or more device commands based on the light signal are determined. The one or more device commands may be determined via demodulation of the light signal. In step 656, an electronic device is controlled based on the one or more device commands. In one example, an IR enabled television may detect and integrate a light signal, decode the light signal into various television related commands, and then perform the television related commands in order to control the IR enabled television.

Figure 7A:
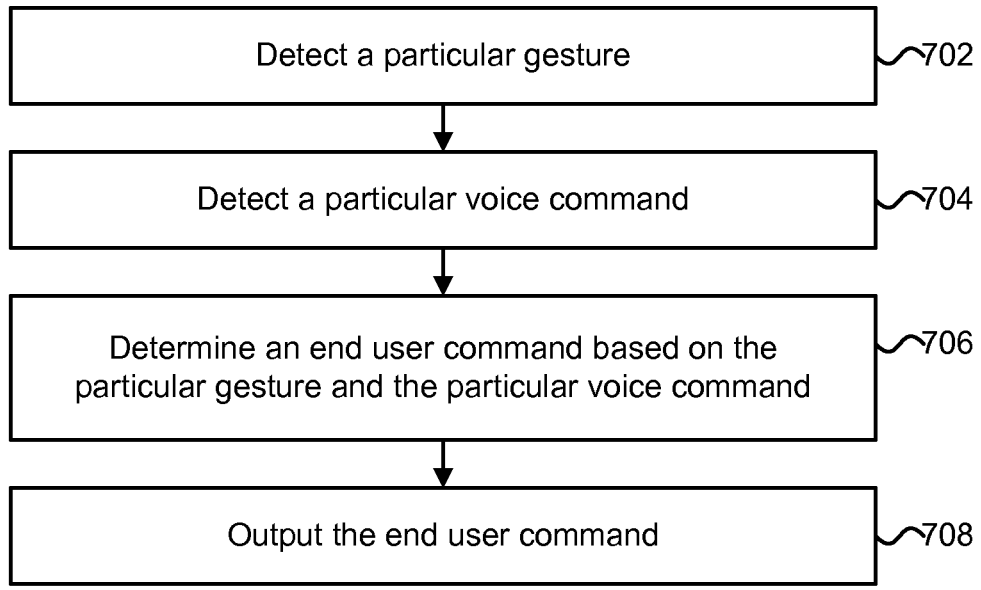
FIG. 7A is a flowchart describing one embodiment of a process for detecting an end user command.

FIG. 7A is a flowchart describing one embodiment of a process for detecting an end user command. The process described in FIG. 7A is one example of a process for implementing step 602 in FIG. 6A or for implementing step 622 in FIG. 6B. The process of FIG. 7A may be performed continuously and by one or more computing devices. Each step in the process of FIG. 7A may be performed by the same or different computing devices as those used in other steps, and each step need not necessarily be performed by a single computing device. In one embodiment, the process of FIG. 7A is performed by a computing environment such as computing environment 12 in FIG. 1.

In step 702, a particular gesture is detected. The particular gesture may be detected via gesture recognition techniques. In step 704, a particular voice command is detected. The particular voice command may be detected via voice recognition techniques. In step 706, an end user command is determined based on the particular gesture detected in step 702 and the particular voice command detected in step 704. In step 708, the end user command is outputted.

Figure 7B:
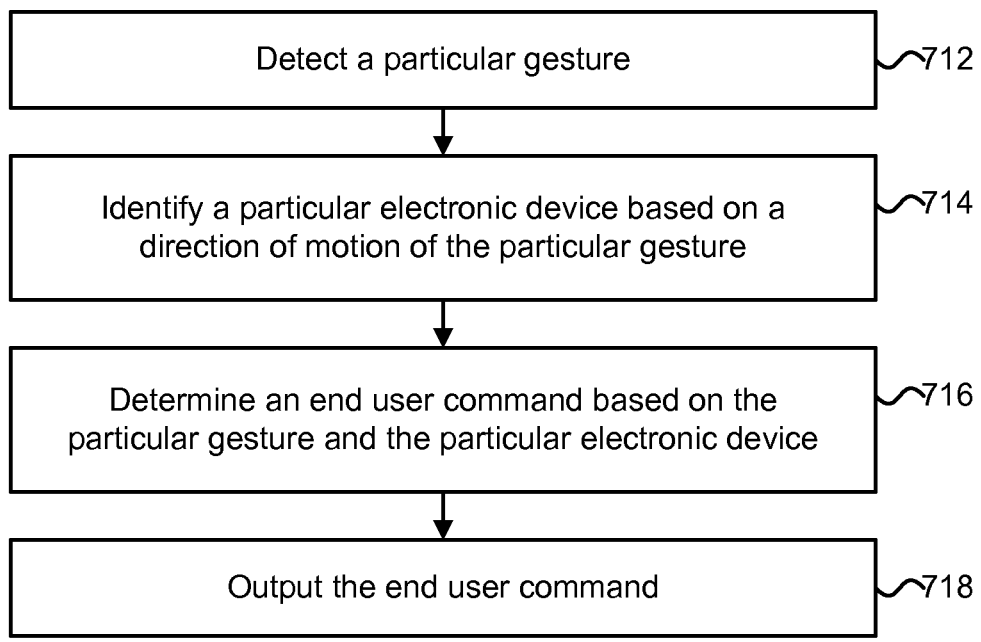
FIG. 7B is a flowchart describing an alternative embodiment of a process for detecting an end user command.

FIG. 7B is a flowchart describing an alternative embodiment of a process for detecting an end user command. The process described in FIG. 7B is one example of a process for implementing step 602 in FIG. 6A or for implementing step 622 in FIG. 6B. The process of FIG. 7B may be performed continuously and by one or more computing devices. Each step in the process of FIG. 7B may be performed by the same or different computing devices as those used in other steps, and each step need not necessarily be performed by a single computing device. In one embodiment, the process of FIG. 7B is performed by a computing environment such as computing environment 12 in FIG. 1.

In step 712, a particular gesture is detected. The particular gesture may be detected via gesture recognition techniques. In step 714, a particular electronic device is identified based on a direction of motion of the particular gesture detected in step 712. The direction of motion of the particular device may be determined using various gesture recognition techniques that utilize skeletal tracking. The direction of motion may be associated with a vector that is projected within an environment in order to determine the particular electronic device within the direction of motion. In step 716, an end user command is determined based on the particular gesture detected in step 712 and the particular electronic device identified in step 714. In one example, the end user command for changing the channel on a particular television may be recognized when the particular electronic device detected is the particular television and the particular gesture includes a circulating motion that is associated with channel selection of the particular television. In step 718, the end user command is outputted.

Figure 7C:
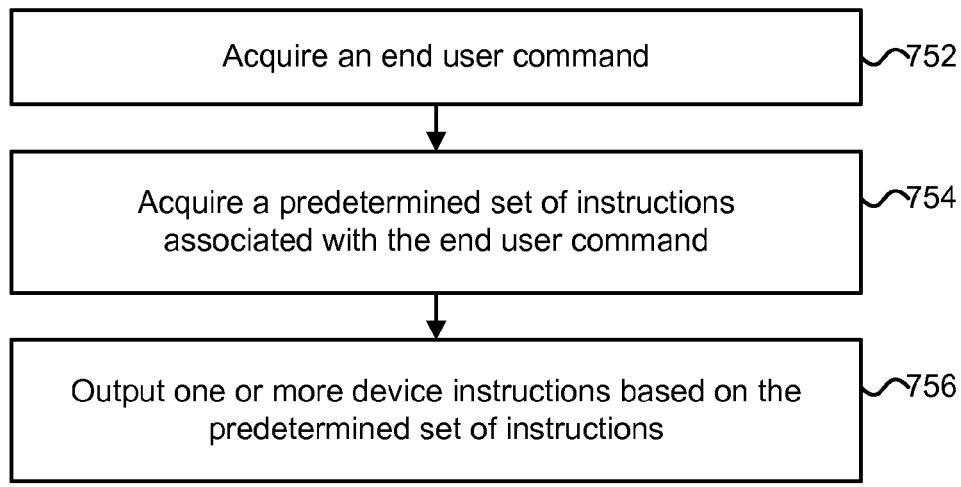
FIG. 7C is a flowchart describing one embodiment of a process for determining one or more device instructions.

FIG. 7C is a flowchart describing one embodiment of a process for determining one or more device instructions. The process described in FIG. 7C is one example of a process for implementing step 604 in FIG. 6A. The process of FIG. 7C may be performed continuously and by one or more computing devices. Each step in the process of FIG. 7C may be performed by the same or different computing devices as those used in other steps, and each step need not necessarily be performed by a single computing device. In one embodiment, the process of FIG. 7C is performed by a computing environment such as computing environment 12 in FIG. 1.

In step 752, an end user command is acquired. In step 754, a predetermined set of instructions associated with the end user command is acquired. In one example, the end user command is recognized as a command for watching a movie and the predetermined set of instructions includes instructions for turning on a television, turning on a VCR, dimming the lights within an environment, and playing the VCR. In step 756, one or more device instructions based on the predetermined set of instructions acquired in step 754 are outputted.

Figure 7D:
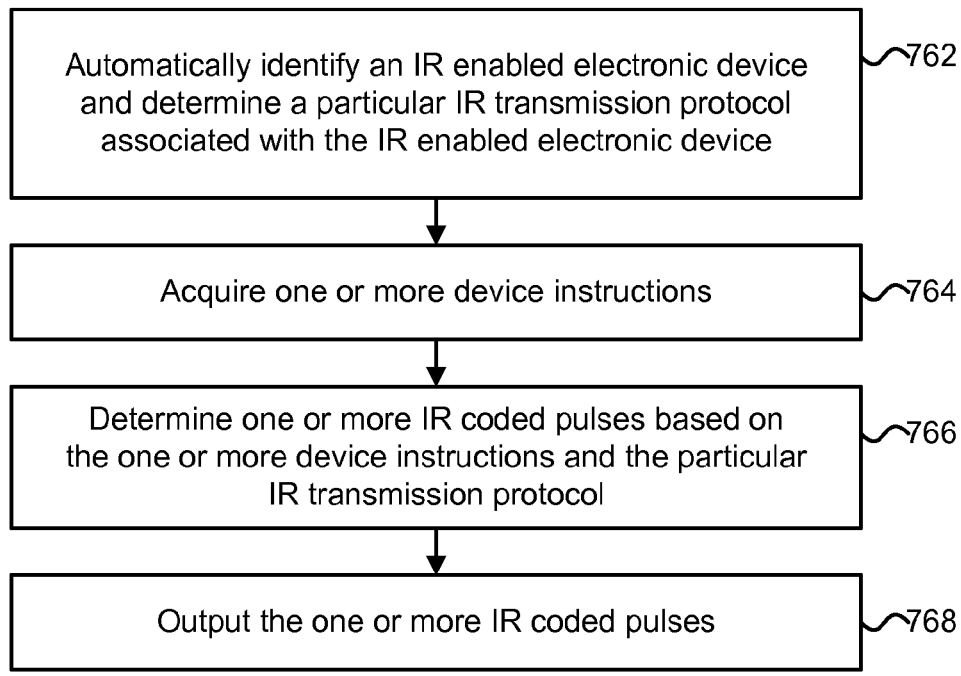
FIG. 7D is a flowchart describing one embodiment of a process for determining one or more coded IR pulses.

FIG. 7D is a flowchart describing one embodiment of a process for determining one or more coded IR pulses. The process described in FIG. 7D is one example of a process for implementing step 606 in FIG. 6A. The process of FIG. 7D may be performed continuously and by one or more computing devices. Each step in the process of FIG. 7D may be performed by the same or different computing devices as those used in other steps, and each step need not necessarily be performed by a single computing device. In one embodiment, the process of FIG. 7D is performed by a computing environment such as computing environment 12 in FIG. 1.

In step 762, an IR enabled electronic device is automatically identified and a particular IR transmission protocol associated with the IR enabled electronic device is automatically determined. One example of a process for automatically identifying an IR enabled electronic device and determining its associated IR transmission protocol is described in reference to FIG. 7E. In step 764, one or more device instructions are acquired. In step 766, one or more IR coded pulses are determined based on the one or more device instructions and the particular IR transmission protocol. Each of the one or more device instructions may map to a set of one or more IR coded pulses. For example, a device instruction for turning on a television may map to a sequence of IR commands (e.g., commands based on the RC-5 protocol or the NEC IR protocol). In step 768, the one or more IR coded pulses are outputted.

Figure 7E:
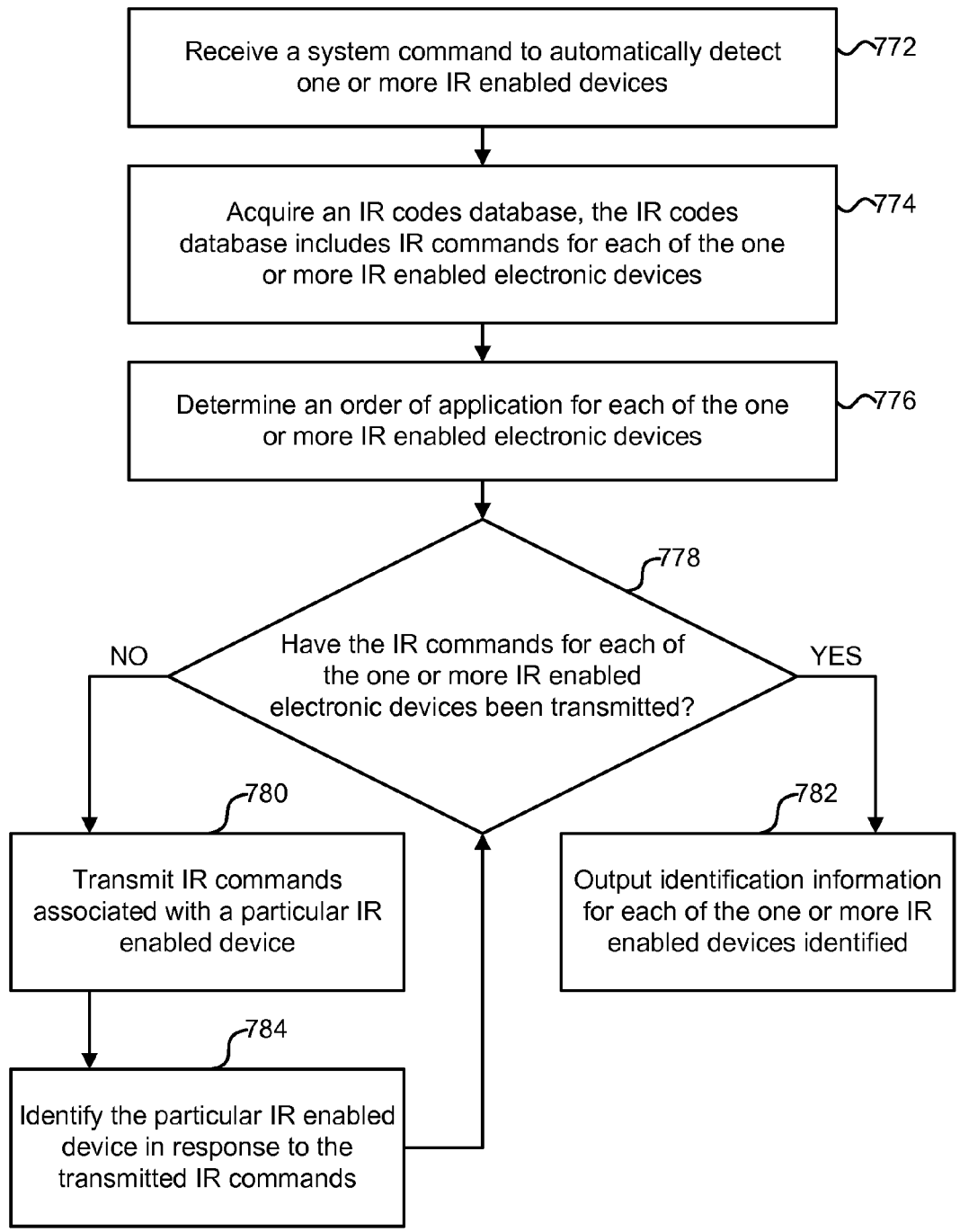
FIG. 7E is a flowchart describing one embodiment of a process for automatically identifying an IR enabled electronic device and determining its associated IR transmission protocol.

FIG. 7E is a flowchart describing one embodiment of a process for automatically identifying an IR enabled electronic device and determining its associated IR transmission protocol. The process described in FIG. 7E is one example of a process for implementing step 762 in FIG. 7D. The process of FIG. 7E may be performed continuously and by one or more computing devices. Each step in the process of FIG. 7E may be performed by the same or different computing devices as those used in other steps, and each step need not necessarily be performed by a single computing device. In one embodiment, the process of FIG. 7E is performed by a computing environment such as computing environment 12 in FIG. 1.

In step 772, a system command to automatically detect one or more IR enabled devices is received. In some cases, the system command may be received in response to an end user command associated with automatically identifying and determining IR enabled electronic devices within an environment. In step 774, an IR codes database is acquired. The IR codes database may include IR commands for a plurality of IR enabled electronic devices. In one example, the IR codes database stores IR commands for each of the one or more IR enabled electronic devices within a particular environment. For example, the IR codes database may store IR commands for each IR enabled electronic device associated with a home entertainment system (e.g., a first set of IR commands for controlling a television and a second set of IR commands for controlling a DVD player).

In step 776, in order of application for each of the one or more IR enabled electronic devices stored within the IR codes database is determined. In step 778, it is determined whether the IR commands for each of the one or more IR enabled electronic devices stored within the IR codes database have been transmitted. If it is determined that not all of the IR commands associated with each of the IR enabled electronic devices stored within the IR codes database have been transmitted, then step 780 is performed. Otherwise, if it is determined that all of the IR commands associated with each of the IR enabled electronic devices stored within the IR codes database have been transmitted, then step 782 is performed.

In step 780, IR commands associated with a particular IR enabled device are transmitted. In one embodiment, the IR commands are projected using an active illumination depth camera. In step 784, the particular IR enabled device is identified in response to the transmitted IR commands. In one embodiment, the particular IR enabled device is identified by transmitting IR commands associated with generating sound and listening for sounds originating from the particular IR enabled device. For example, the transmitted IR commands for a particular television may comprise turning on the particular television, tuning to a particular channel, and turning up the volume of the particular television. Detection and localization of the sounds generated in response to the transmitted IR commands may be determined using sound source localization techniques. Sound source localization techniques may be used to localize the direction of a sound source by detecting time differences in the arrival time of different sounds due to the speed of sound being captured by a plurality of microphones. Sound source localization techniques may also include performing pattern matching on each of the audio signals received by each microphone of the plurality of microphones.

In one embodiment, identification information and localization information for each of the one or more IR enabled devices identified may be stored for future use by a gesture recognition engine. For example, determining that a particular type of television is located in a particular part of an environment may allow the gesture recognition engine to identify the particular television when being pointed to by an end user. In step 782, identification information for each of the one or more IR enabled devices identified is outputted. Each of the one or more IR enabled devices identified may be associated with a particular IR transmission protocol (e.g., the RC-5 protocol or the NEC IR protocol) based on the IR commands used to identify the particular IR enabled device in step 784.

Figure 7F:
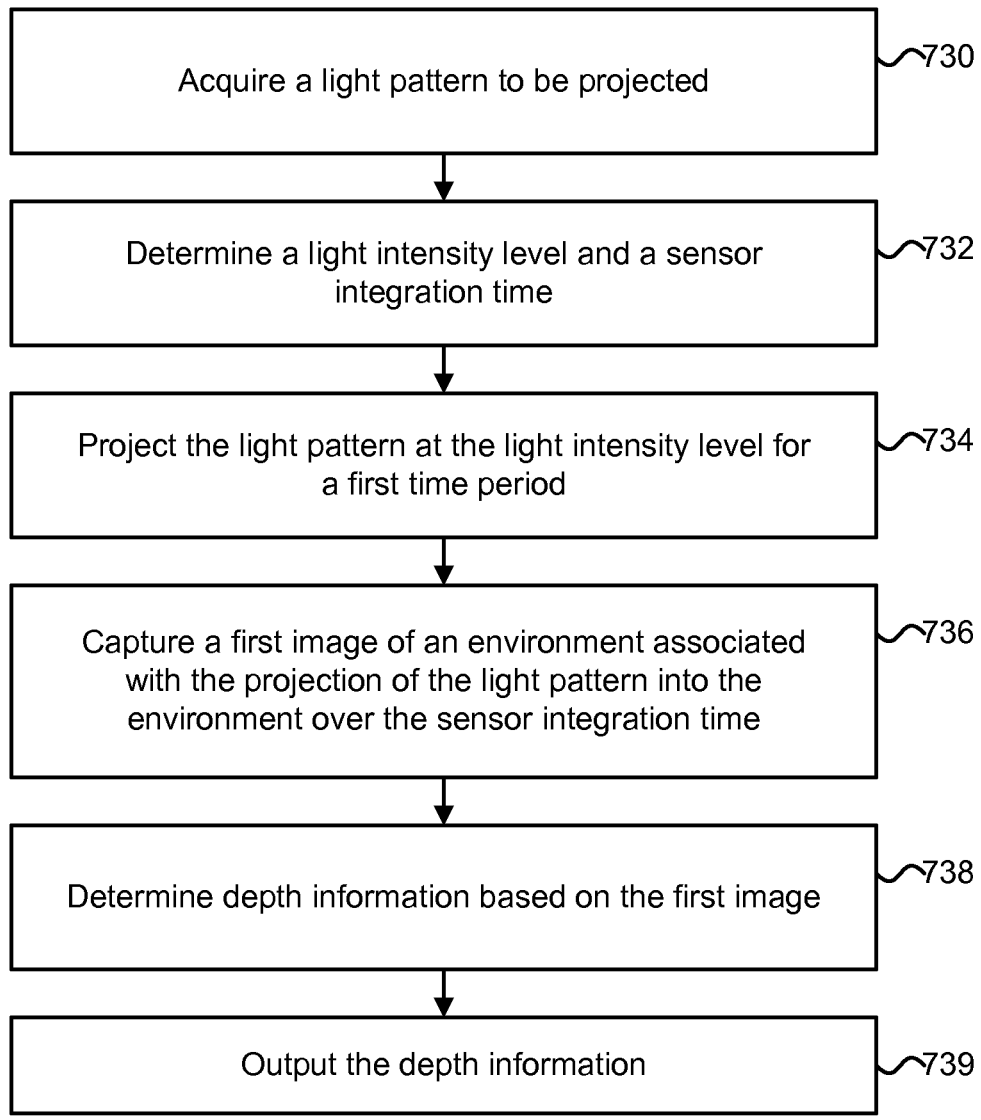
FIG. 7F is a flowchart describing one embodiment of a process for generating depth information.

FIG. 7F is a flowchart describing one embodiment of a process for generating depth information. The process described in FIG. 7F is one example of a process for implementing step 612 in FIG. 6A. The process of FIG. 7F may be performed continuously and by one or more computing devices. Each step in the process of FIG. 7F may be performed by the same or different computing devices as those used in other steps, and each step need not necessarily be performed by a single computing device. In one embodiment, the process of FIG. 7F is performed by a computing environment such as computing environment 12 in FIG. 1.

In step 730, a light pattern to be projected is acquired. In step 732, a light intensity level and a sensor integration time associated with the light pattern to be projected are determined. In step 734, the light pattern acquired in step 730 is projected at the light intensity level determined in step 732 for a first period of time. In step 736, a first image of an environment is captured associated with the projection of the light pattern into the environment over the sensor integration time determined in step 732. In step 738, depth information based on the first image is determined. In step 709, the depth information is outputted.

Figure 8:
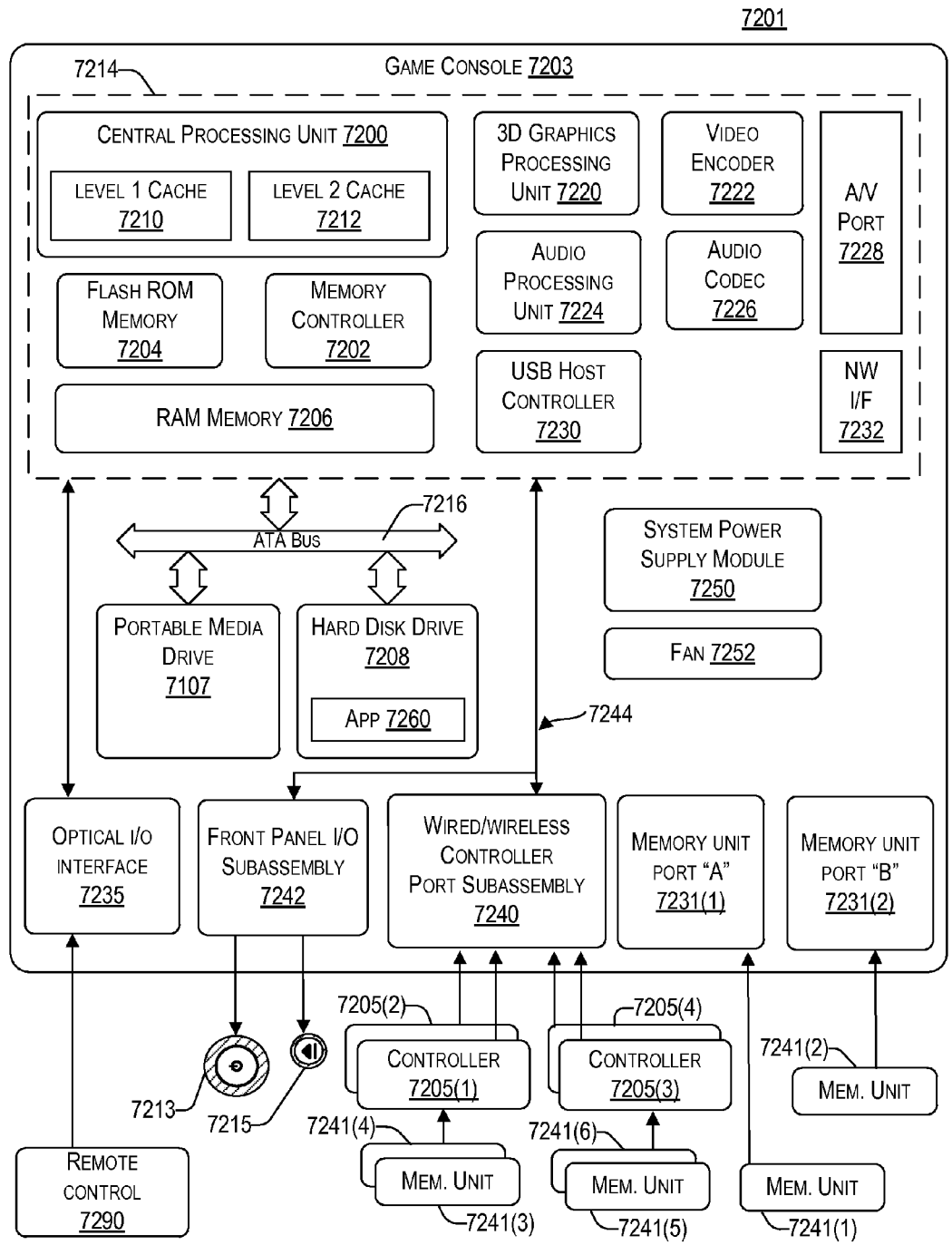
FIG. 8 is a block diagram of an embodiment of a gaming and media system.
Figure 9:
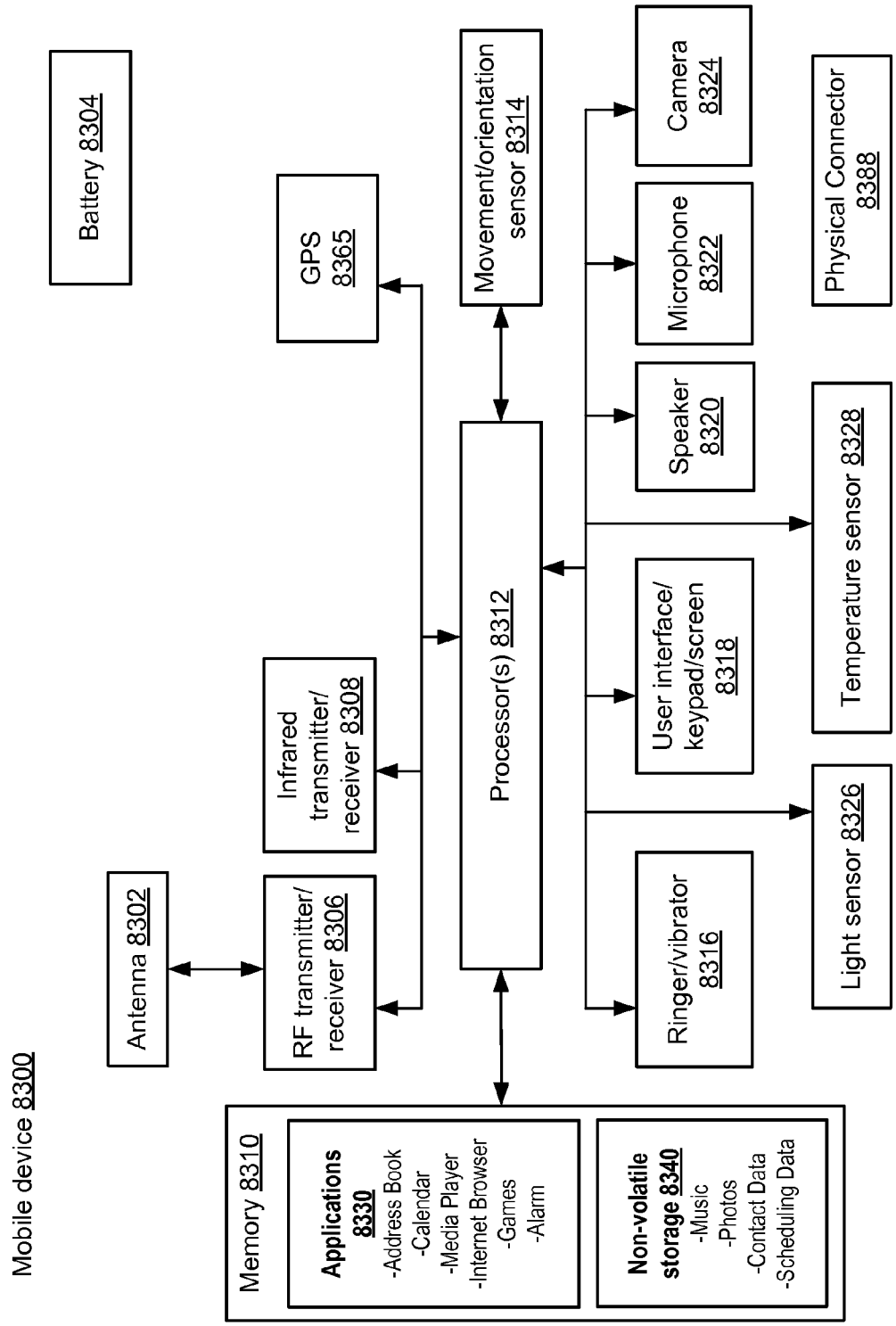
FIG. 9 is a block diagram of one embodiment of a mobile device.
Figure 10:
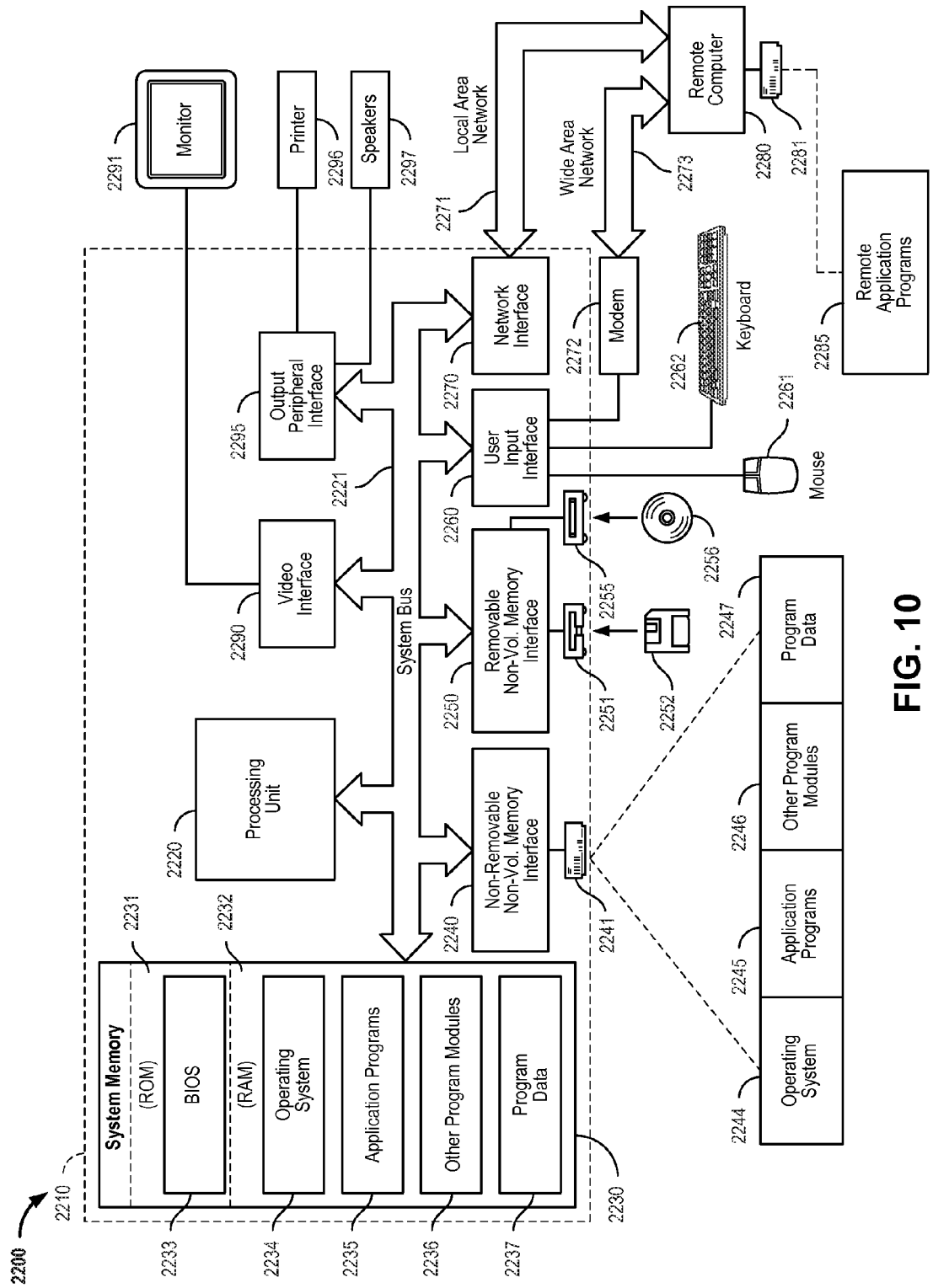
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIG. 3. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUS 7241(1) and 7241(2) are illustrated as being connectable to MU ports "A" 7231(1) and "B" 7231(2) respectively. Additional MUS (e.g., MUS 7241(3)-7241(6)) are illustrated as being connectable to controllers 7205(1) and 7205(3), i.e., two MUS for each controller. Controllers 7205(2) and 7205(4) can also be configured to receive MUS (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, such as a mobile version of computing system 10 in FIG. 3. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing system 10 in FIG. 3. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling one or more electronic devices, comprising:
    detecting a particular gesture;
    determining a particular electronic device of the one or more electronic devices based on the particular gesture;
    determining a plurality of coded light pulses for controlling the particular electronic device based on the particular gesture;
    embedding a plurality of higher frequency light pulses within a first coded light pulse of the plurality of coded light pulses for controlling the particular electronic device;
    projecting a sequence of light patterns originating from an active illumination depth camera into an environment, the sequence of light patterns includes the plurality of coded light pulses for controlling the particular electronic device; and
    generating depth information associated with the environment, the generating depth information includes capturing a first image of the environment associated with a first high frequency light pulse of the plurality of higher frequency light pulses and generating the depth information using the first image, the generating depth information includes capturing one or more images associated with reflections of at least a subset of the sequence of light patterns within the environment.

2. The method of claim 1, wherein:
    the detecting the particular gesture includes performing skeletal tracking of a person within the environment performing the particular gesture.

3. The method of claim 1, further comprising:
determining the particular electronic device of the one or more electronic devices based on a direction of motion associated with the particular gesture.

4. The method of claim 1, wherein:
the active illumination depth camera utilizes time-of-flight techniques for obtaining the depth information; and
the plurality of coded light pulses correspond with a remote control protocol.

5. The method of claim 1, wherein:
the generating depth information overlaps in time with the projecting a sequence of light patterns.

6. The method of claim 1, further comprising:
detecting a new end user command based on the first image, the sequence of light patterns includes one or more new light pulses associated with the new end user command.

7. The method of claim 1, further comprising:
determining environmental characteristics associated with the environment; and
modifying a light intensity associated with one or more light patterns of the sequence of light patterns based on the environmental characteristics.

8. The method of claim 1, wherein:
the determining a plurality of coded light pulses includes acquiring one or more IR transmission protocols associated with the one or more electronic devices.

9. The method of claim 1, wherein:
the determining a plurality of coded light pulses includes automatically identifying the one or more electronic devices.

10. The method of claim 9, wherein:
the automatically identifying the one or more electronic devices includes transmitting one or more commands associated with the particular electronic device, the one or more commands cause the particular electronic device to generate sound, the automatically identifying the one or more electronic devices includes detecting and localizing sounds within the environment in response to the transmitting one or more commands.

11. A system for controlling one or more electronic devices, comprising:
an active illumination depth camera; and
one or more processors configured to detect a particular gesture and determine a particular electronic device of the one or more electronic devices based on the particular gesture, the one or more processors configured to determine a plurality of coded IR pulses for communicating with the particular electronic device based on the particular gesture and embed a plurality of higher frequency light pulses within a first coded light pulse of the plurality of coded IR pulses, the one or more processors configured to direct the active illumination depth camera to project a sequence of light patterns into an environment, the sequence of light patterns includes the plurality of coded IR pulses for communicating with the particular electronic device, the active illumination depth camera configured to capture a first image of the environment associated with a first high frequency light pulse of the plurality of higher frequency light pulses, the one or more processors configured to generate depth information associated with the environment based on the first image, the one or more processors configured to acquire one or more images associated with reflections of at least a subset of the sequence of light patterns within the environment and generate the depth information using the one or more images.

12. The electronic device of claim 11, wherein:
the one or more processors configured to perform skeletal tracking of a person within the environment and detect the particular gesture based on the skeletal tracking.

13. One or more storage devices containing non-transitory processor readable code for programming one or more processors to perform a method for controlling one or more electronic devices comprising the steps of:
identifying a particular gesture associated with the one or more electronic devices;
determining a particular electronic device of the one or more electronic devices based on a direction of motion associated with the particular gesture;
determining a plurality of coded IR pulses for controlling the particular electronic device;
embedding a plurality of higher frequency light pulses within a first coded light pulse of the plurality of coded IR pulses for controlling the particular electronic device;
modulating one or more light patterns projected from an active illumination depth camera into an environment, the one or more light patterns includes the plurality of coded IR pulses for controlling the particular electronic device; and
generating depth information associated with the environment, the generating depth information includes capturing a first image of the environment associated with a first high frequency light pulse of the plurality of higher frequency light pulses and generating the depth information using the first image, the generating depth information includes capturing one or more images associated with reflections of at least a subset of the one or more light patterns within the environment.

14. The one or more storage devices of claim 13, wherein:
the modulating one or more light patterns includes modulating an amplitude of at least a subset of the one or more light patterns projected from the active illumination depth camera.

15. The one or more storage devices of claim 13, wherein:
the modulating one or more light patterns includes modulating a frequency of the one or more light patterns projected from the active illumination depth camera.

16. The one or more storage devices of claim 13, further comprising:
identifying an end user command corresponding with the particular gesture and determining the plurality of coded IR pulses based on the end user command.

\* \* \* \* \*